Figure 1:
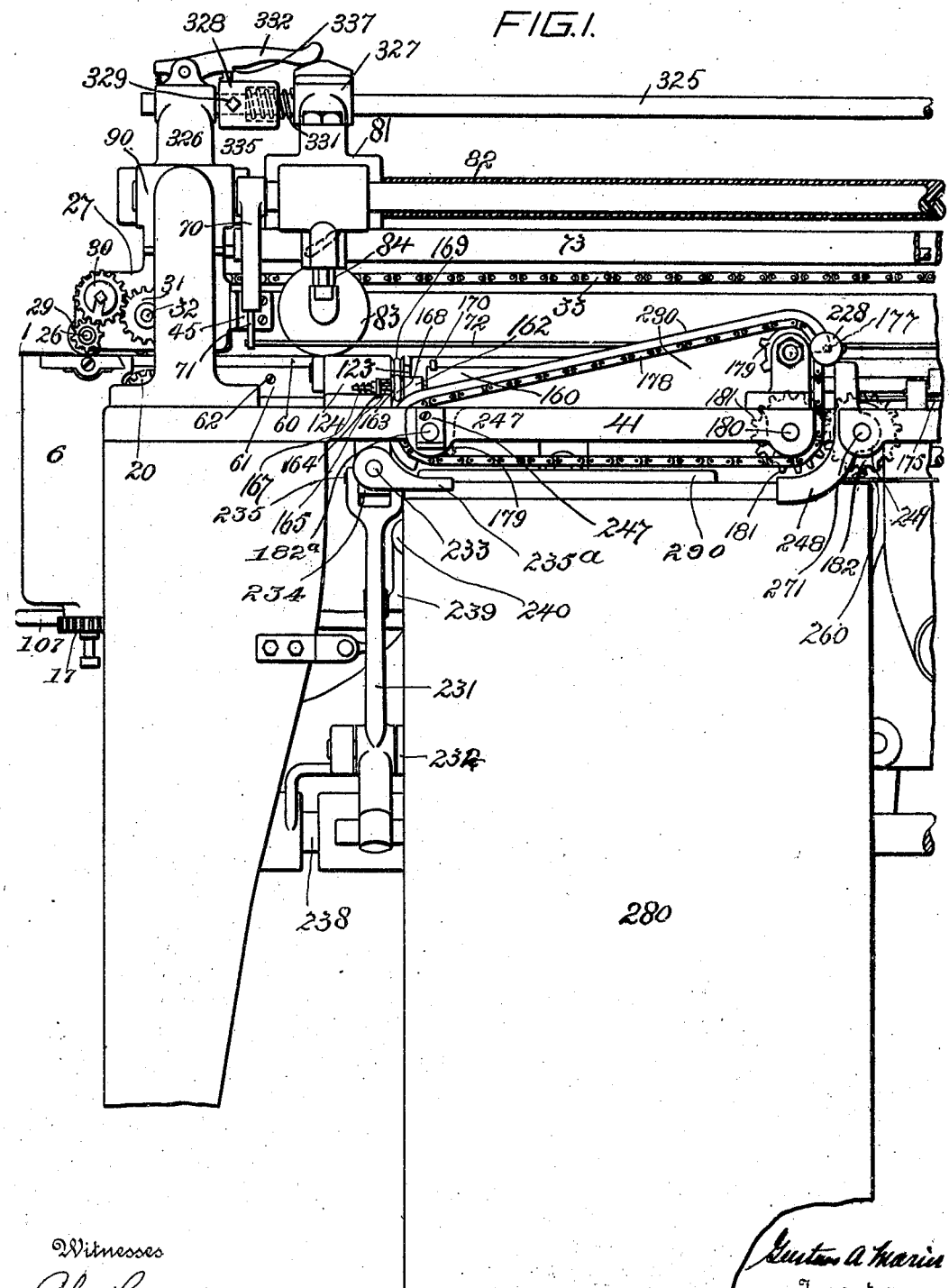

No. 806,272. PATENTED DEC. 5, 1905.
G. A. MARIER.
TOBACCO LEAF STRIPPING AND BOOKING MACHINE.
APPLICATION FILED DEC. 30, 1904.

14 SHEETS—SHEET 6.

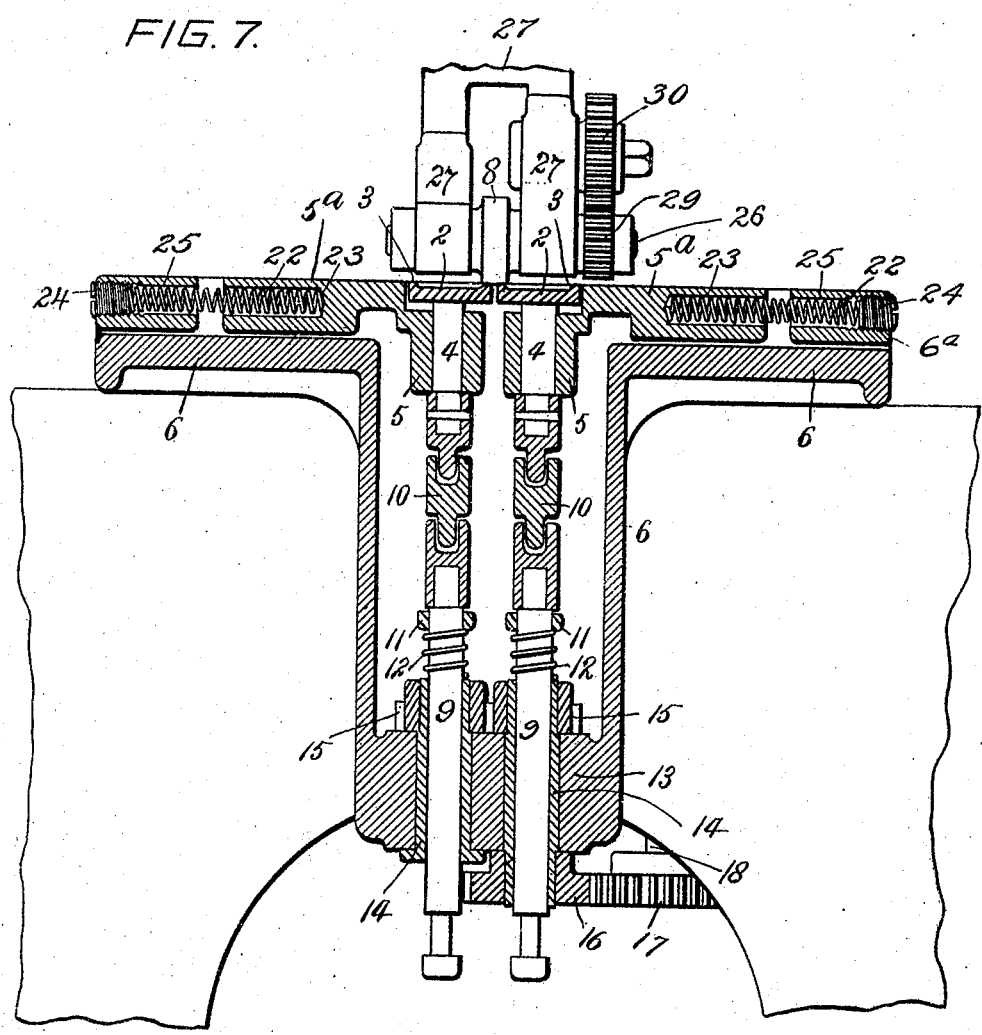

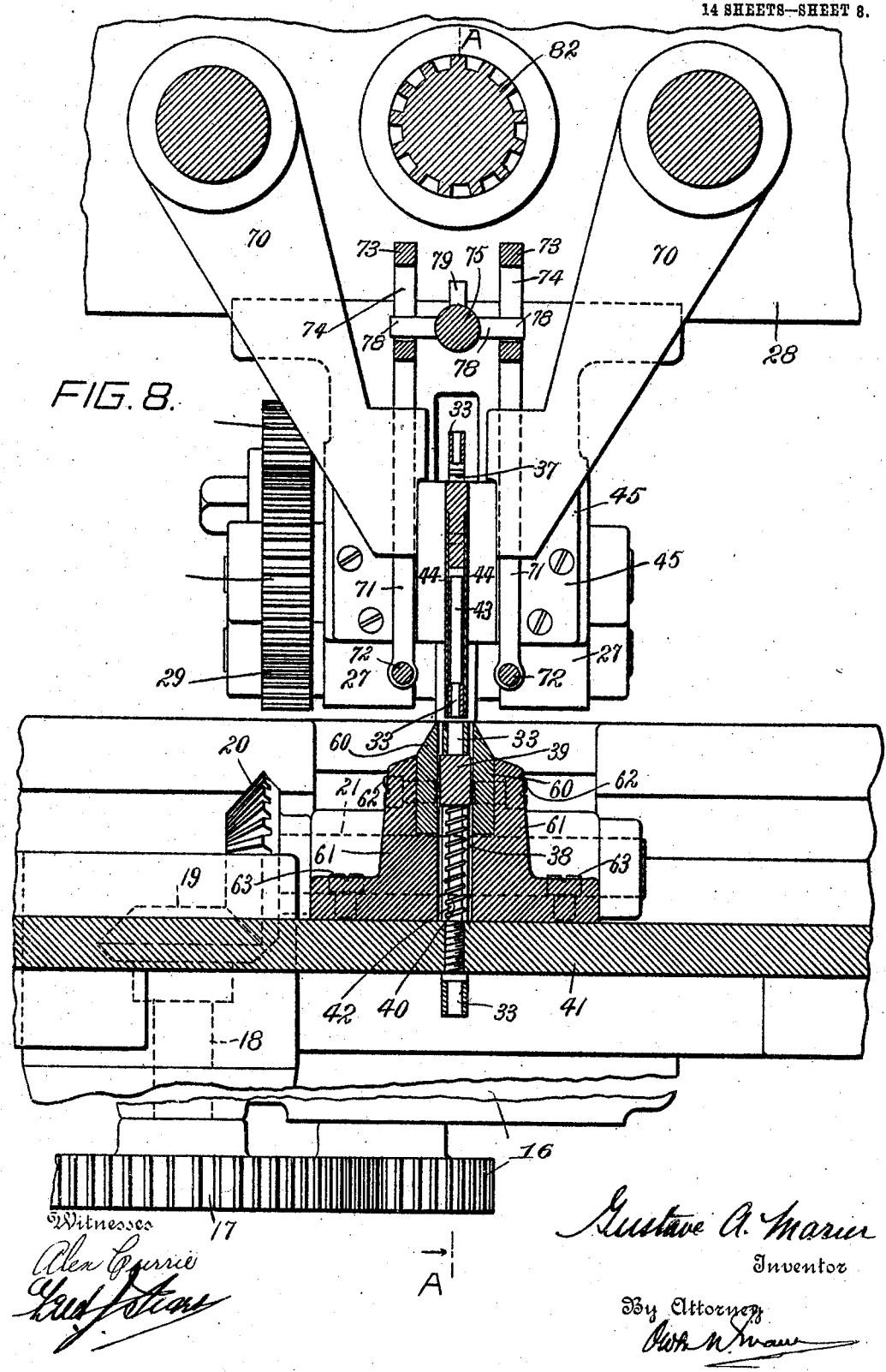

No. 806,272. PATENTED DEC. 5, 1905.
G. A. MARIER.
TOBACCO LEAF STRIPPING AND BOOKING MACHINE.
APPLICATION FILED DEC. 30, 1904.
14 SHEETS—SHEET 9.
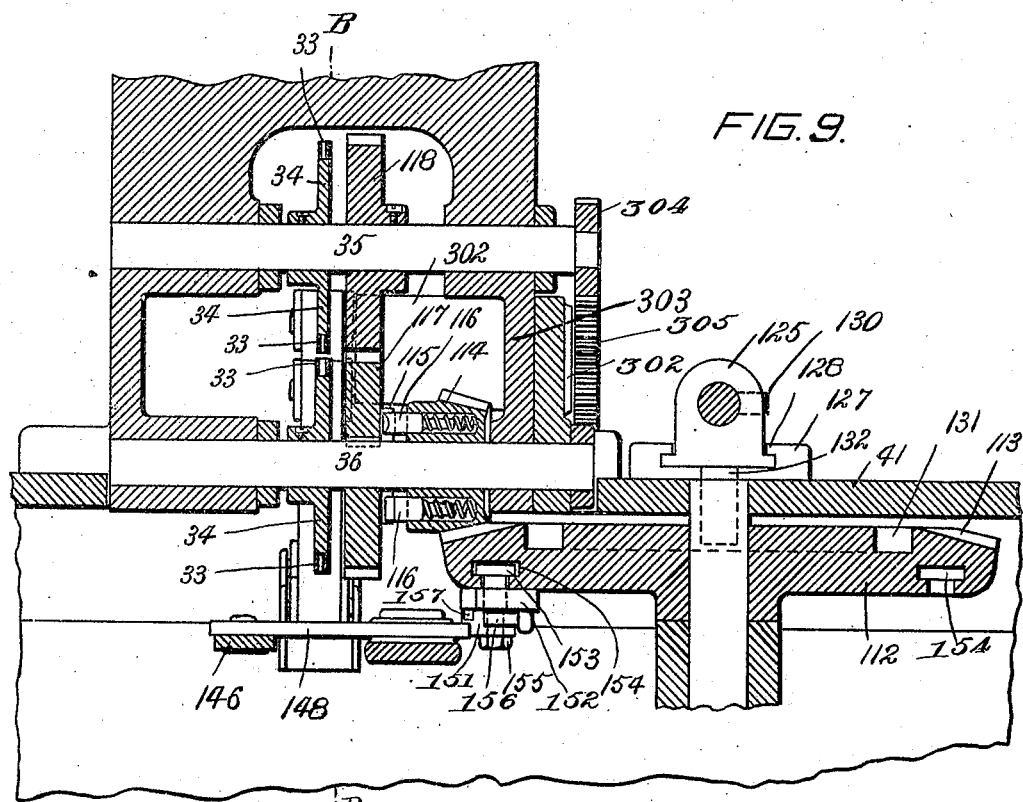
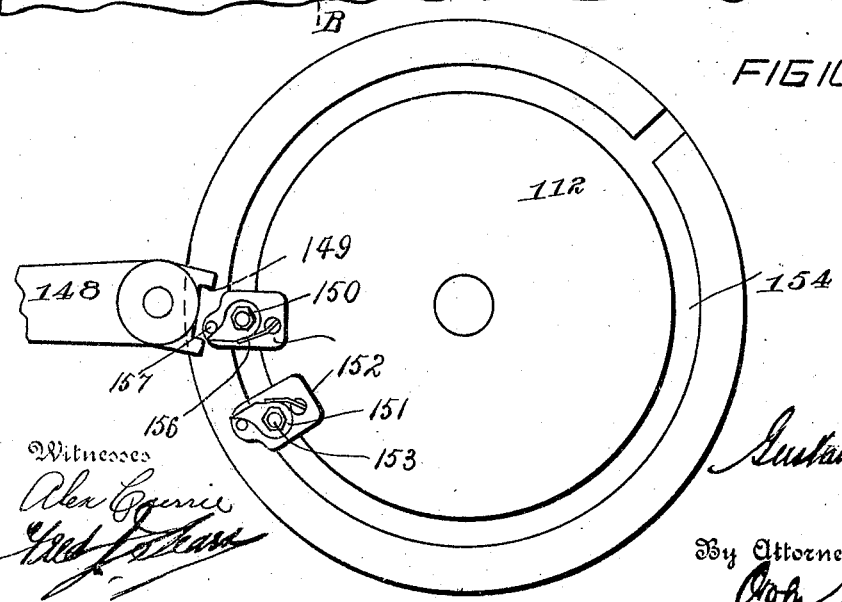

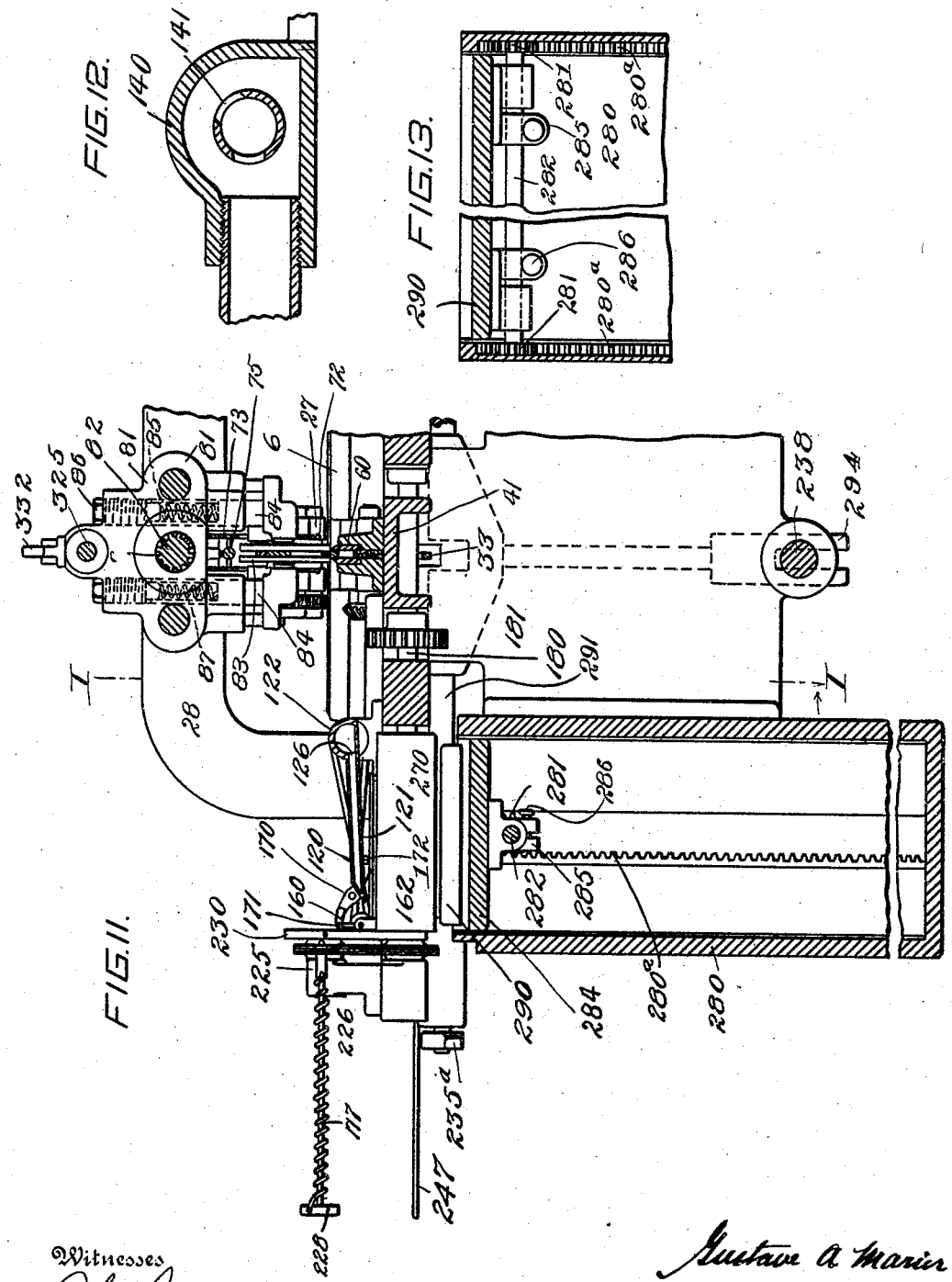

No. 806,272. PATENTED DEC. 5, 1905.
G. A. MARIER.
TOBACCO LEAF STRIPPING AND BOOKING MACHINE.
APPLICATION FILED DEC. 30, 1904.

14 SHEETS—SHEET 11.

No. 806,272. PATENTED DEC. 5, 1905.
G. A. MARIER.
TOBACCO LEAF STRIPPING AND BOOKING MACHINE.
APPLICATION FILED DEC. 30, 1904.
14 SHEETS—SHEET 12.
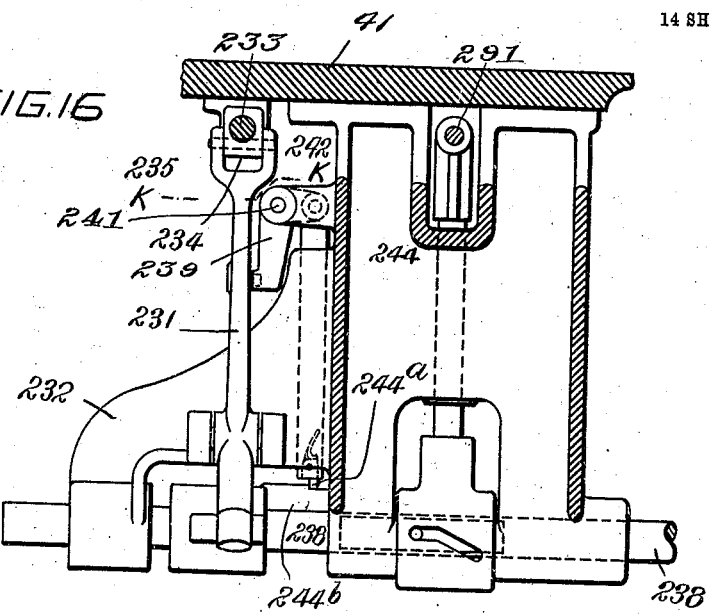
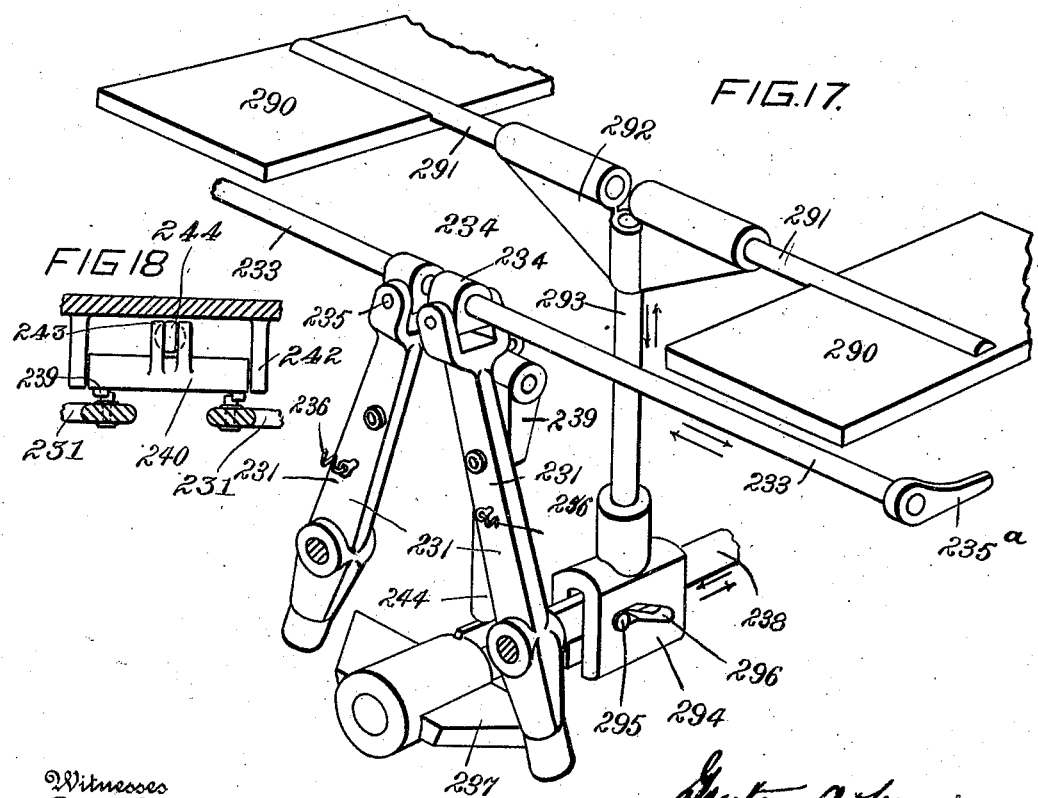

No. 806,272. PATENTED DEC. 5, 1905.
G. A. MARIER.
TOBACCO LEAF STRIPPING AND BOOKING MACHINE.
APPLICATION FILED DEC. 30, 1904.
14 SHEETS—SHEET 13.
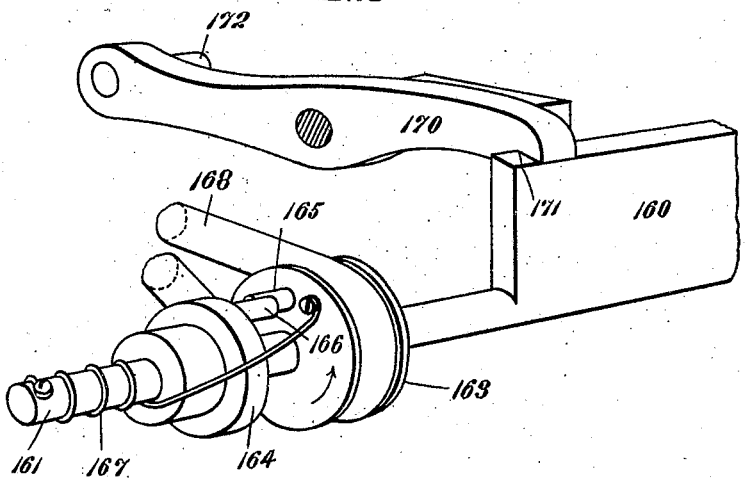
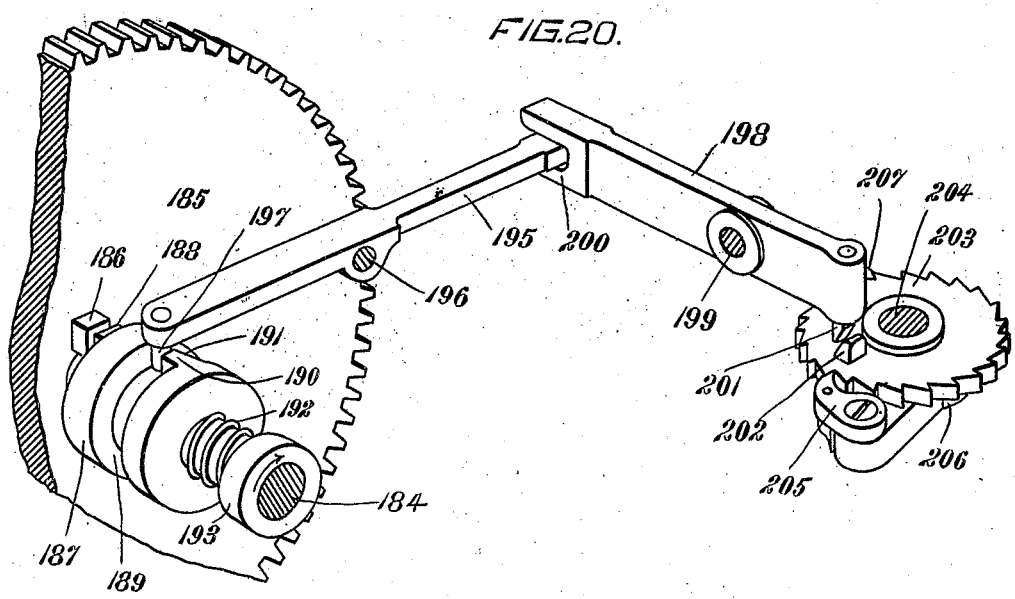

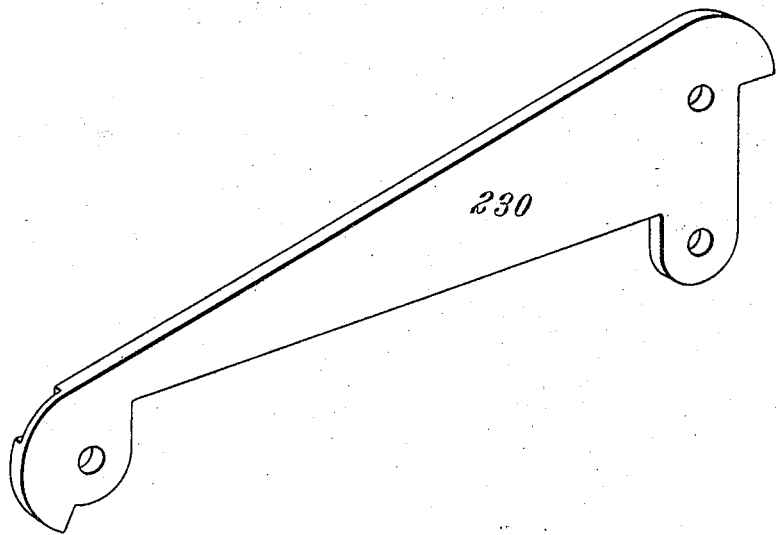

UNITED STATES PATENT OFFICE.

GUSTAVE ANTOINE MARIER, OF MONTREAL, CANADA, ASSIGNOR TO S. DAVIS & SONS, OF MONTREAL, CANADA, A FIRM.

TOBACCO-LEAF STRIPPING AND BOOKING MACHINE.

No. 806,272.    Specification of Letters Patent.    Patented Dec. 5, 1905.

Application filed December 30, 1904. Serial No. 239,052.

*To all whom it may concern:*

Be it known that I, GUSTAVE ANTOINE MARIER, of the city of Montreal, Province of Quebec, Canada, have invented certain new and useful Improvements in Tobacco-Leaf Stripping and Booking Machines; and I do hereby declare that the following is a full, clear, and exact description of the same.

My invention relates particularly to machines of the type disclosed in my Patent No. 758,765, granted May 3, 1904, "Improvements in machines for the treatment of tobacco-leaves;" and it has for its object to accelerate the operation of such machines and cause better work to be done.

The principal features of my present invention are as follows: mechanism for feeding the leaves to the conveying-chains, whereby they are placed upon the blades, such feed mechanism being adapted to automatically accommodate articles of varying cross-sections; means for intermittently acting upon and stretching the leaf over the cutting device just prior to the cutting operation; suction means for removing the leaf-halves from the cutting device after the cutting operation and placing them upon the booking means; booking mechanism of novel construction adapted to fold predetermined quantities of leaf-halves and convey the same to a pair of receptacles; presser-plates adapted to press the booked leaves into the receptacles; a screw and an operative connection therebetween and the roller for pressing the leaves upon the cutting-blades, whereby such roller is caused to reciprocate over the latter; means adapted to act upon the leaf-halves delivered to the booking devices and retain them against movement with the suction devices in their return to their positions adjacent to the blades, and other means and specific features hereinafter set forth, and pointed out in the claims.

For full comprehension, however, of my invention reference must be had to the accompanying drawings, forming a part of this specification, in which similar reference characters indicate the same parts, and wherein—

Figure 2:
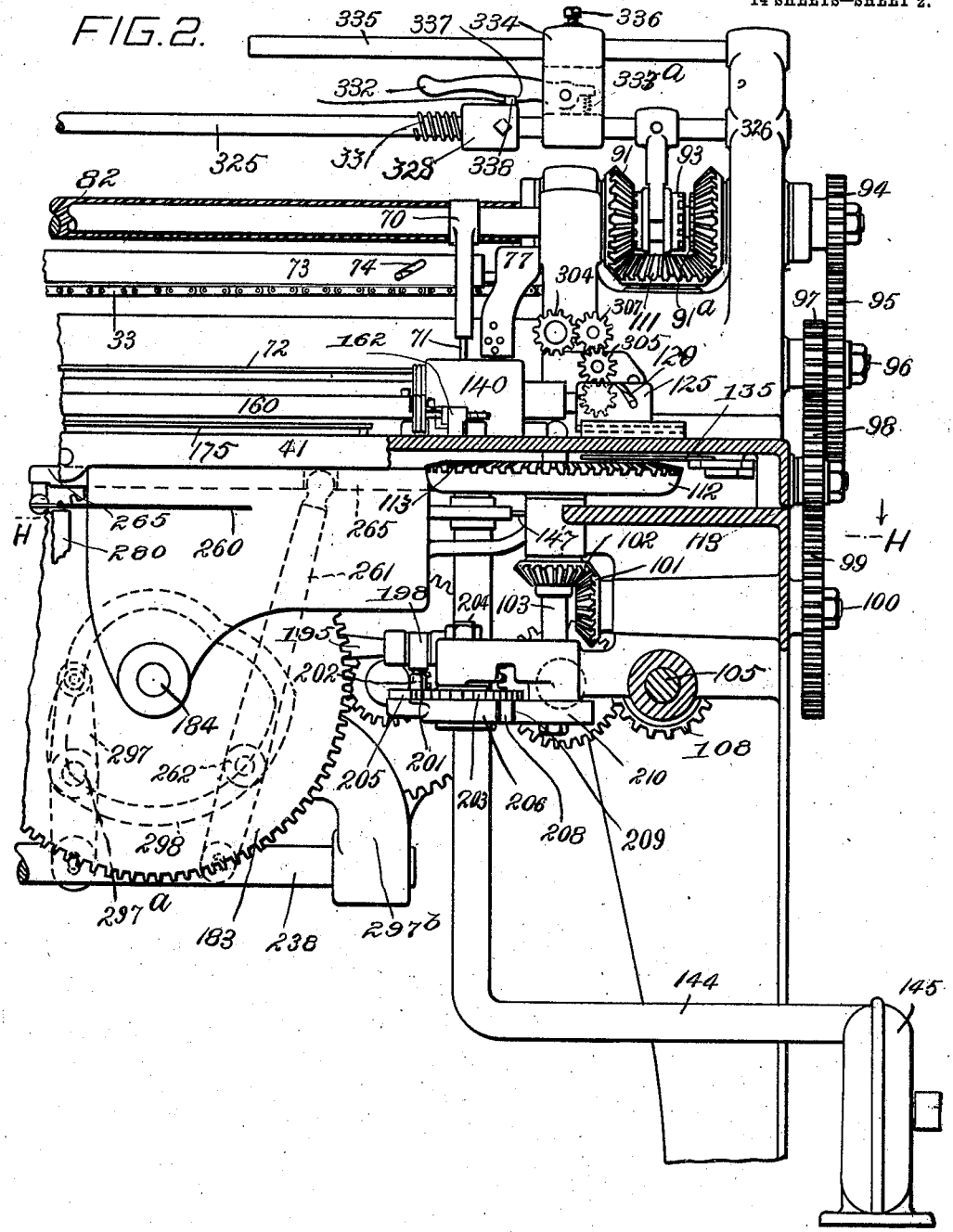
Figure 3:
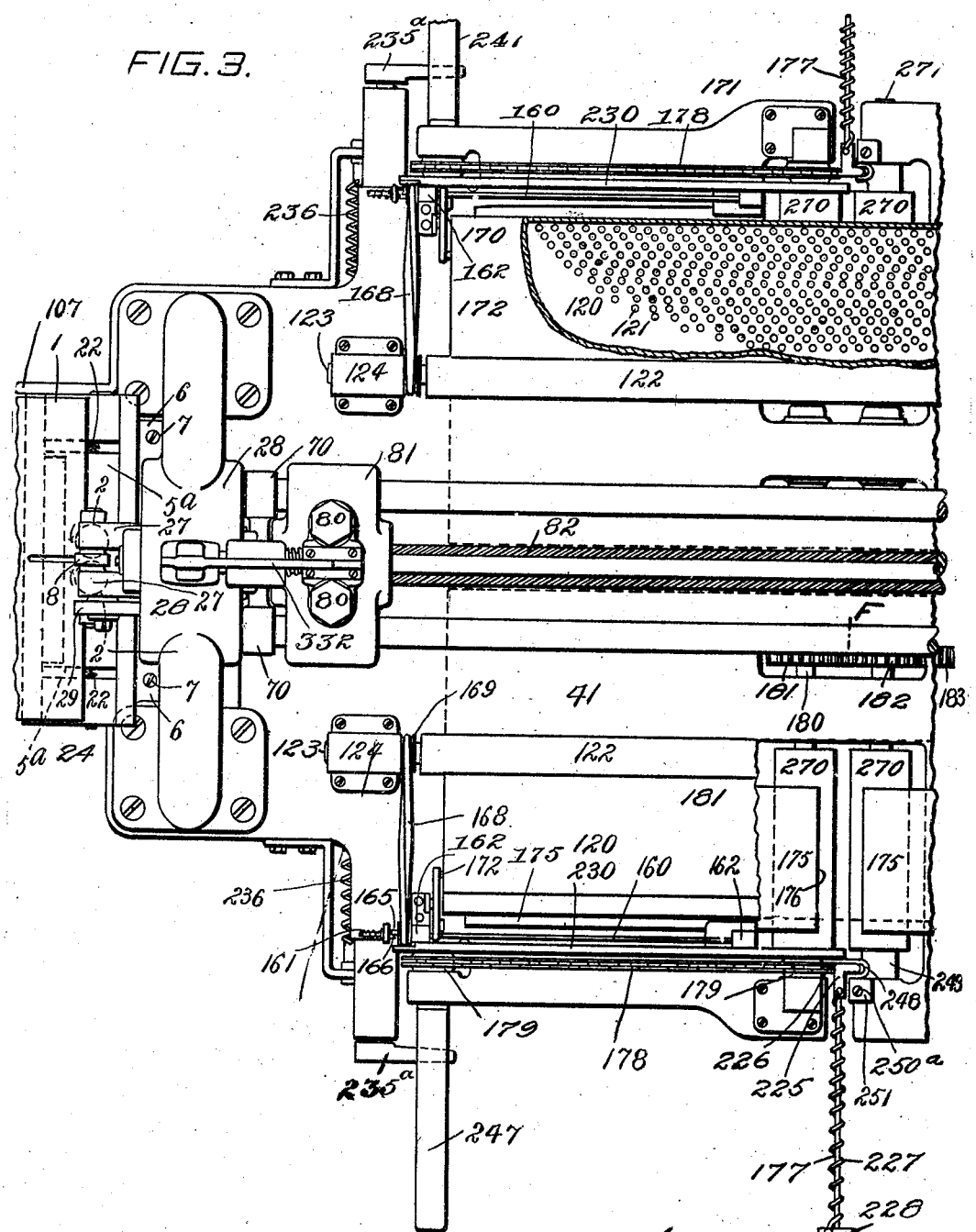
Figure 4:
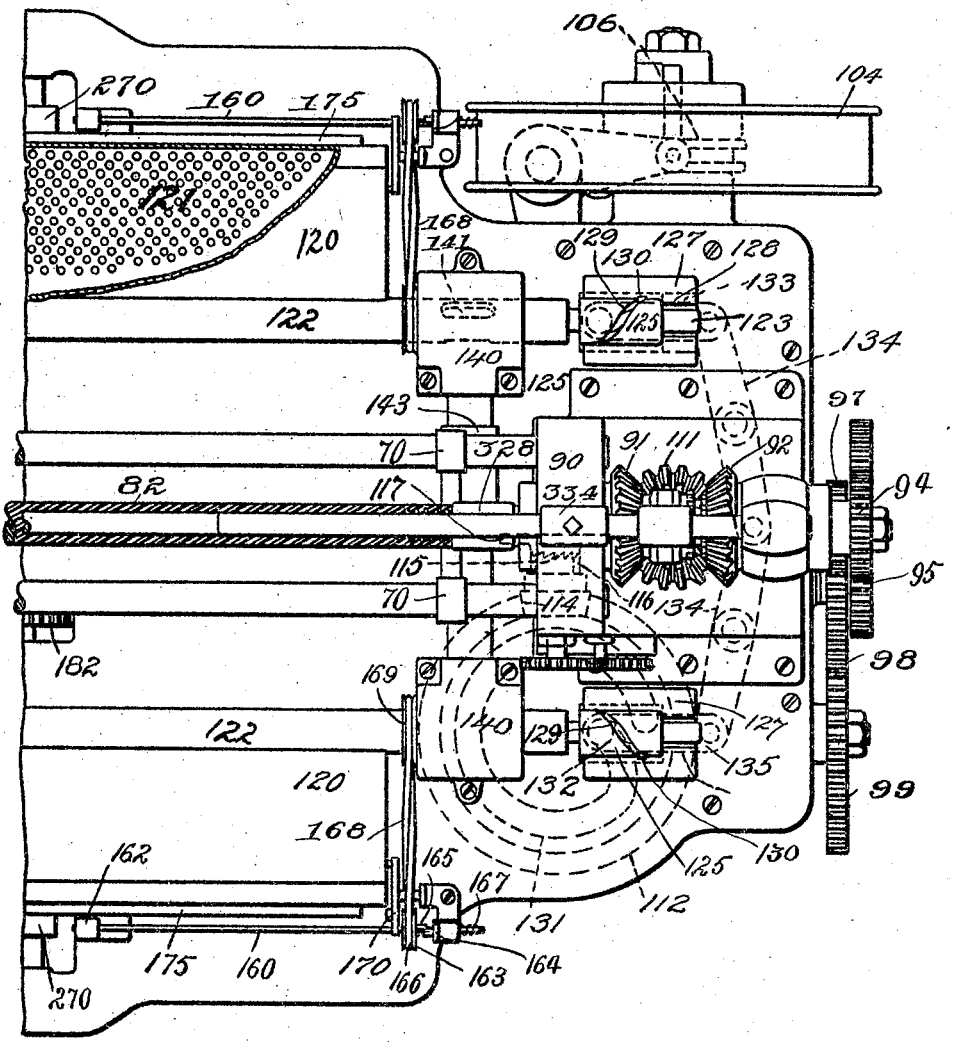
Figure 5:
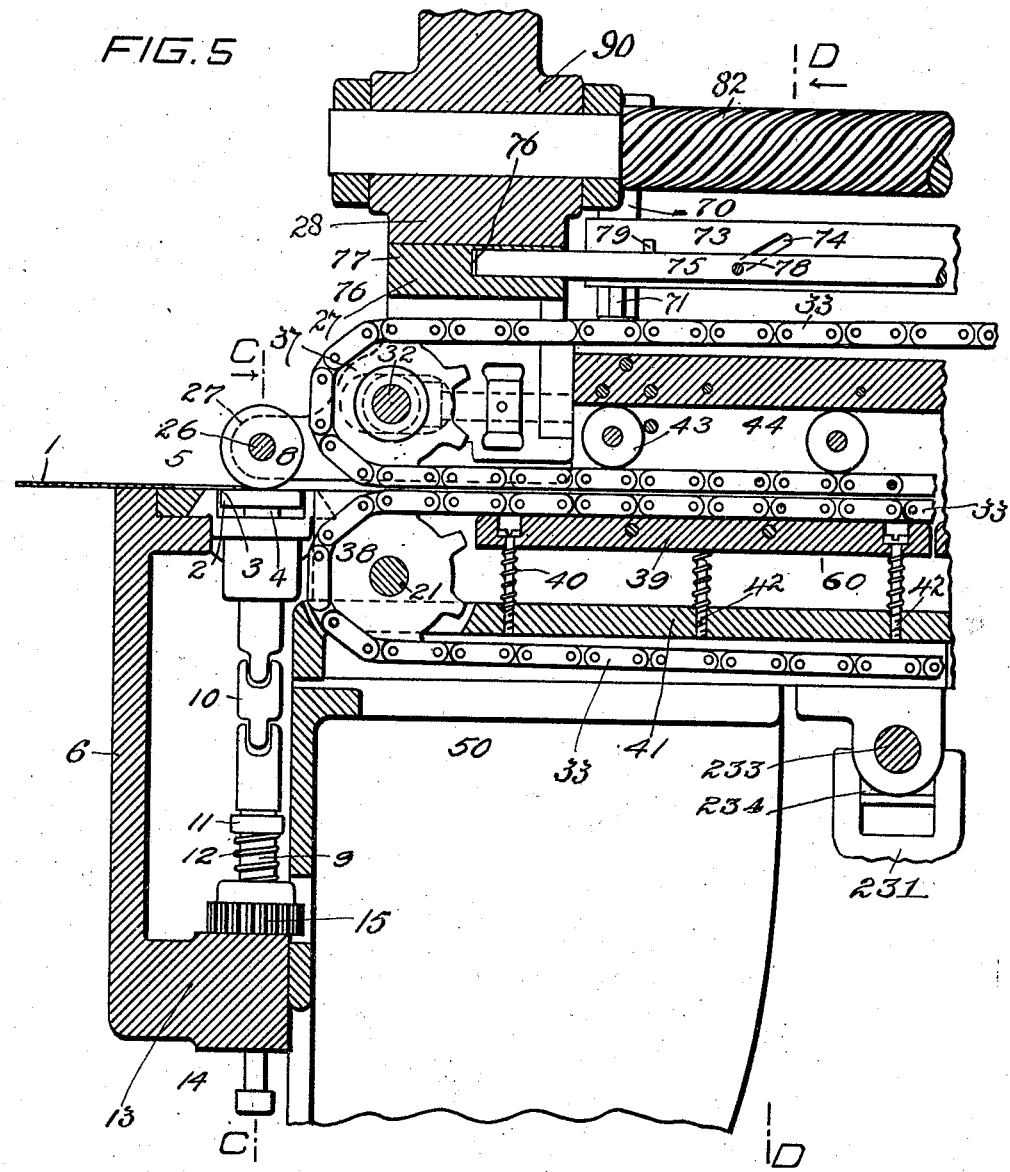
Figure 6:
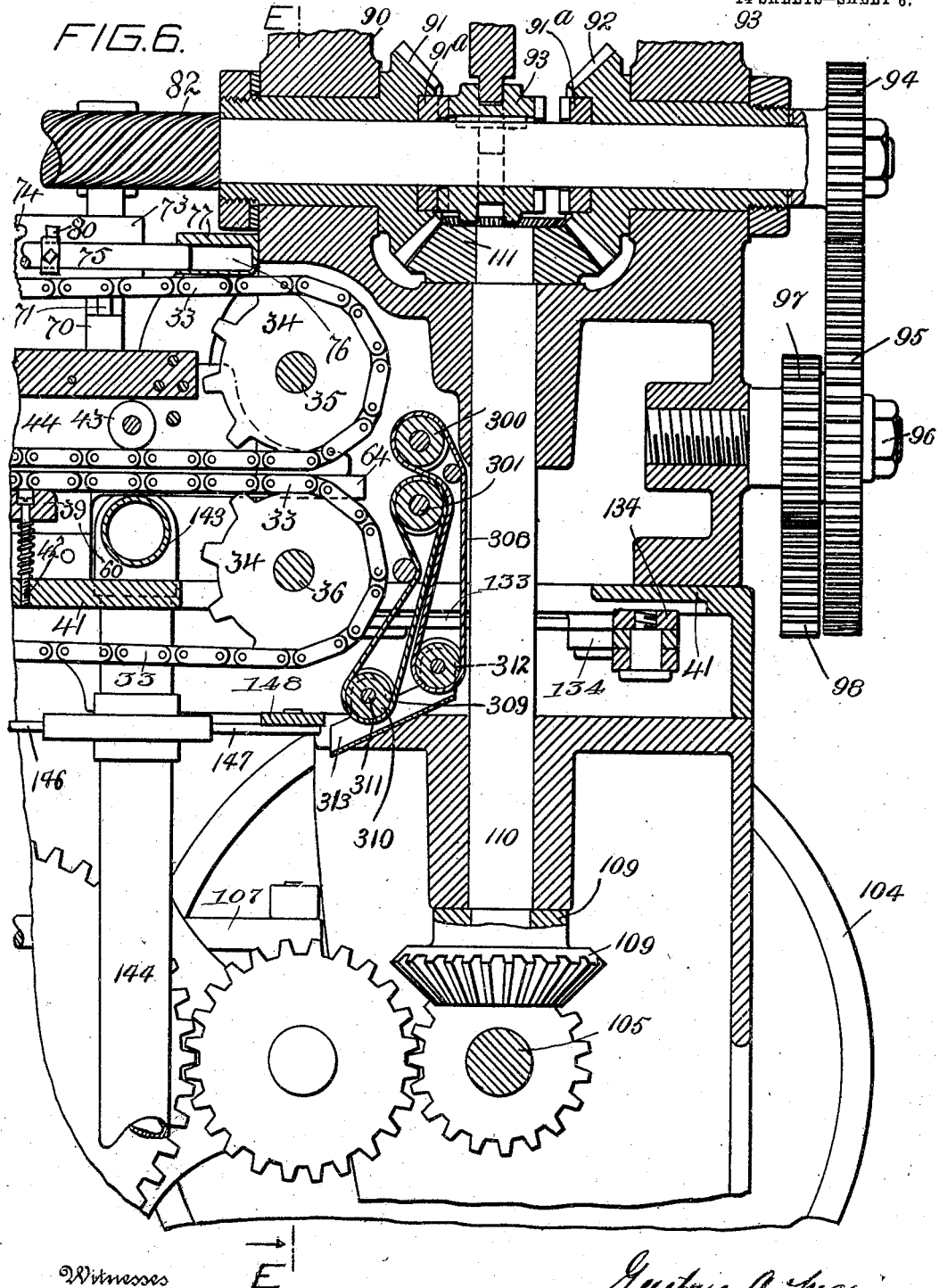
Figure 14:
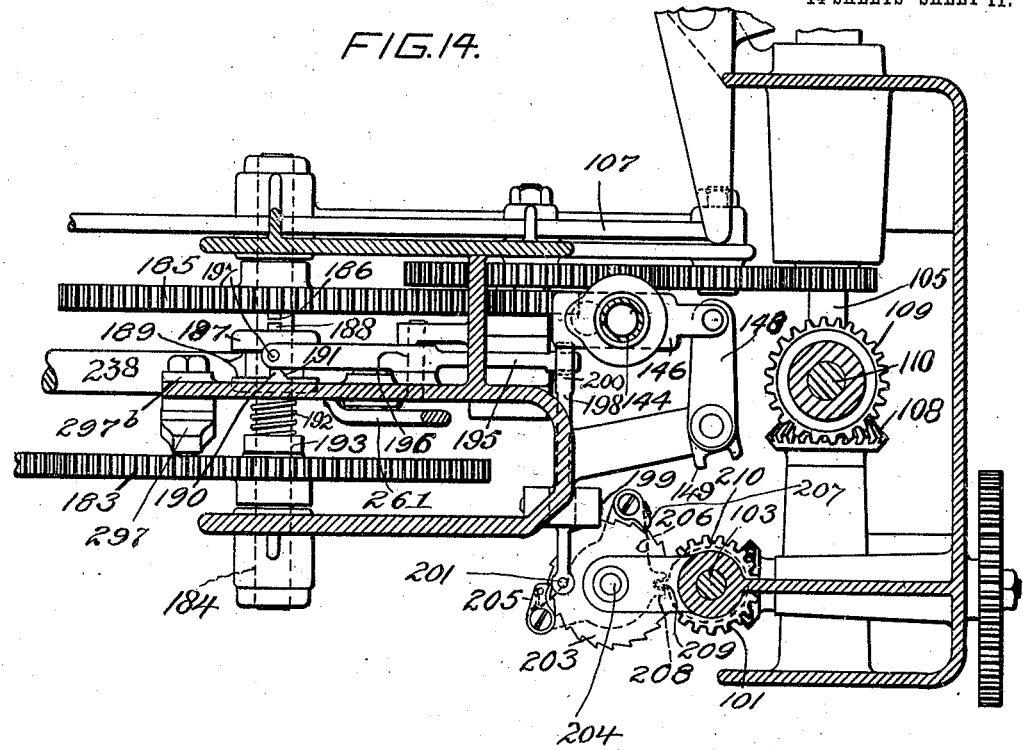
Figure 15:
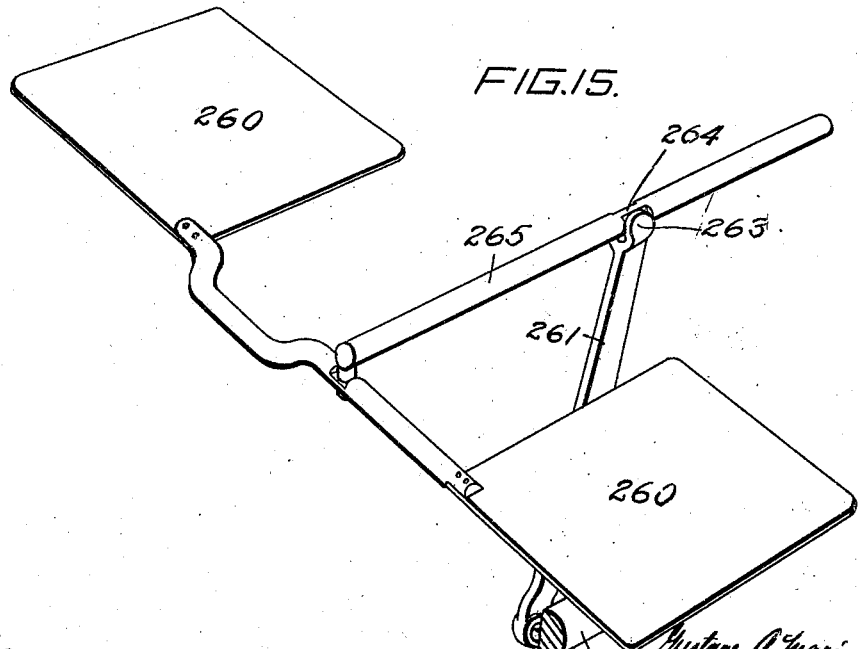

Figure 1 is a side elevation of the end of the machine at which the leaves are fed. Fig. 2 is a side elevation of the opposite end thereof with the near leg broken off and the driving-shaft and its bearing in section. Fig. 3 is a plan view of the portion of the machine illustrated in Fig. 1 with the flies illustrated in positions adjacent to the booking devices and one of such flies with the side thereof which is uppermost when the flies are in such positions broken away to disclose the perforations. Fig. 4 is a similar view to Fig. 3 and illustrates the portion of the machine illustrated in Fig. 2. Fig. 5 is a longitudinal vertical sectional view of the feeding end of the machine, taken on line A A, Fig. 8. Fig. 6 is a longitudinal vertical sectional view of the rear end of the machine, taken on line B B, Fig. 9. Fig. 7 is a transverse vertical sectional view taken on line C C, Fig. 5. Fig. 8 is a transverse vertical sectional view taken on line D D, Fig. 5. Fig. 9 is a transverse vertical sectional view taken on line E E, Fig. 6. Fig. 10 is a detail view illustrating the under side of the multiple cam, together with a portion of the means for actuating the valve for controlling the suction exerted upon the flies. Fig. 11 is a transverse vertical sectional view taken on line F F, Fig. 3. Fig. 12 is a detail transverse sectional view of one of the suction-boxes, taken at right angles to its axis. Fig. 13 is a detail sectional view of one of the packing-boxes, taken at right angles to such boxes as they are illustrated in Fig. 11. Fig. 14 is a horizontal sectional view taken on line H H, Fig. 2. Fig. 15 is a detail perspective view of the plates for supporting the folded leaf-halves while they are being conveyed to the packing-boxes. Fig. 16 is a longitudinal sectional view taken on line I I, Fig. 11. Fig. 17 is a detail perspective view illustrating particularly the presser-plates, the means whereby they are reciprocated, and the means whereby the leaf-conveying spindles are removed from the folded leaf-halves, the bearings for the said parts and the portions of the frame and other parts contiguous to the said parts being omitted; and Fig. 18 is a detail horizontal sectional view taken on line K K, Fig. 16. Fig. 19 is a detail perspective view of a portion of the means for preventing the stemmed leaf-half returning with the fly after the latter has delivered it upon the booking mechanism, and Fig. 20 is a detail perspective view of a portion of the mechanism for operating the booking devices. Fig. 21 is a detail perspective view of the guide-plate upon which the spindle for conveying the booked leaves rides.

The leaf is placed with the butt of the stem between the initial feed-rollers, by which it is drawn to the outer end of the chain-feed, which places it over the blades and resting upon them. The presser-roller then advances and severs the leaf-halves from the stem. Each of the separated leaf-halves rests upon a hollow fly having one side perforated and adapted to retain the leaf-half thereon by suction, as will be hereinafter set forth. The pair of flies deliver the leaf-halves upon a pair of tables, and a pair of the booking devices act upon the leaf-halves when a predetermined quantity thereof have been placed upon the tables and fold them and convey them to a pair of boxes, in which they are pressed or packed. The stripped stems are conveyed from the blades out of the machine.

I will describe the parts of my invention in their continuity relatively to the progress o the operation of the machine.

A spreading-table 1, secured to the frame of the machine, is for the purpose of enabling the leaves to be spread or flattened out before being fed between the initial feed-rollers.

The leaf to be stripped is, as above mentioned, placed with the butt of its stem between initial feed-rollers, which feed it to the chains for conveying it to the position in which it is cut. This feeding device consists of a pair of rollers 2, constructed, preferably, of metal or other rigid material and having the bearing edges of their perimeters rounded, as at 3, to prevent damage to the leaf, such rollers being mounted rigidly upon a pair of vertical shafts 4, arranged with their axes parallel to one another and supported in bearings 5 upon a dovetailed plate 5ª, mounted slidably in a guideway in a bracket 6, secured by cap-screws 7 to the front of the machine. The stem of the leaf is retained between these rollers by a retaining-roller 8, adapted to prevent vertical displacement of the stem. The shafts 4 are connected to a second pair of shafts 9 by a ball-and-socket connection 10, and they are supported through rigid collars 11 thereon and springs 12 upon an inward extension 13 of bracket 6, such extension having a pair of sleeves 14 carried rotatably therein and having a pair of intermeshing spur-gears 15 mounted rigidly upon their ends, and a spur-gear 16, rigidly mounted upon the lower end of one of them. This latter gear intermeshes with and receives motion from a spur-gear 17, mounted rigidly upon the lower end of a vertical shaft 18, the upper end whereof has a bevel-gear 19 rigidly mounted thereon. This bevel-gear is driven by a similar gear 20, mounted rigidly upon a shaft 21, to be hereinafter further referred to. This arrangement of parts causes the feed-rollers 2 to bear yieldingly upwardly upon the stem and at the same time to rotate in the direction indicated in Figs. 1, 3, 4, while there is a slight lateral movement toward and away from one another which is accommodated by the ball-and-socket connection These feed-rollers are held yieldingly toward one another and in bearing relation with the stem by springs 22, bearing at one end in sockets 23 in the dovetailed plate 5ª and at their other ends upon screw-plugs 24, screwed into the tapped outer ends of borings 25 in a detachable plate 6ª, forming a part of bracket 6.

The retaining-roller 8 is mounted rigidly upon a shaft 26, carried rotatably in a forked bearing-bracket 27, secured to an arched portion 28 of the frame of the machine, and it is driven by a spur-gear 29, mounted rigidly upon one end of its shaft, such gear intermeshing with an idler 30, which in turn intermeshes with a spur-gear 31, mounted rigidly upon a shaft 32, referred to hereinafter.

The chains for receiving each leaf from the initial feeding device and conveying it to its proper position over the blades are indicated at 33 and carried by a pair of sprocket-wheels 37 and 38, mounted rigidly upon a pair of shafts 32 and 21, and a second pair of sprocket-wheels 34, mounted, respectively, upon the shafts 35 and 36. The uppermost strand of the lower chain and the lowermost strand of the upper chain, which rests thereon, are supported upon a series of blocks 39, each with a spring 40 beneath it and resting upon the table 41 of the frame 50 of the machine, through openings in which guiding-pins 42 upon the under side of such blocks project. A series of rollers 43ᶜ, carried between a pair of carrying-plates 44, localize the lower strand of the upper chain and the upper strand of the lower chain with the stem of the leaf between them relatively to the cutting edges of the blades, the plates being secured by brackets 45 to the frame of the machine. The blades (indicated at 60) are located one at each side of the chain and are supported in base-blocks 61, to which they are secured by screws 62, such blocks being secured to the table by cap-screws 63. These blades extend from the front end of the machine to within a short distance of the rear thereof, their rear ends terminating in a pair of guides 64, extending slightly beyond the chains to guide the stems clear to the stem delivery, to be hereinafter described. After the leaf has been fed to its position over the blades ready to have its halves separated therefrom and just before it is cut I cause it to be stretched over the cutting edges by the following means: Two pairs of brackets 70 are secured to a pair of rods (to be hereinafter mentioned) and two pairs of vertical slide-rods 71, passing through the lower offset ends of such brackets, having a pair of round horizontal bars 72, secured to their lower ends, and the upper ends of the rods 71 are rigidly secured to the opposite ends of a pair of flat bars 73, each diagonally slotted, as at 74, adjacent to its opposite ends. A reciprocatory rod 75, extending parallel to and above the blades, is supported slidably in the borings 76 in crotch of the brackets 27 and 77 of the machine-frame and has a pair of transverse pins 78 carried rigidly thereby and projecting into the slots 74. This rod is reciprocated longitudinally by the reciprocating cross-head carrying the presser-rollers, which act upon the blades, such cross-head, which will be presently described, acting upon a pair of stops 79 and 80, the latter being adjustable to enable the extent of reciprocation to be varied. The cross-head is indicated at 81, Figs. 1 and 11, and is interiorly screw-threaded to engage the threads of a rotary screw-shaft 82. A pair of presser-rollers 83 are rotatably carried by the lower end of a pair of counterbored vertical axles 84, projecting upwardly into a pair of borings 85, the upper ends whereof are tapped and closed by a pair of adjustable screw-plugs 86, between the inner ends whereof and the bottoms of the counterborings a pair of expansile helical springs 87 bear, thus causing the rollers 83 to bear yieldingly upon the edges of the blades. Upon the rotation of the screw-shaft 82 these presser-rollers are caused to travel to and fro along such cutting edges and the leaf-stretching rods are raised and lowered relatively to the latter. The screw-shaft is supported and intermittently rotated alternately in opposite directions, as follows: It is supported at its ends in bearings 90 upon the frame of the machine, and a pair of gears 91 and 92 are mounted loosely thereon a short distance apart and adjacent to one end thereof, while a clutch-block 93 is keyed thereto between such gears and is adapted to be automatically shifted by means of a shipper 325 (to be presently described) into engagement with either of the adjacent faces of the said gears, which have clutch facing-plates 91$^a$ secured rigidly thereon. The end of the screw-shaft adjacent to this clutch has thereon a spur-gear 94, intermeshing with an idler 95, loosely mounted upon a stub-axle 96, upon which a small pinion 97 (also an idler) is loosely mounted, this spur-gear and pinion being rigidly secured together to rotate in unison. The pinion 97 intermeshes with an idle pinion 98, which intermeshes with a spur-gear 99, which is mounted rigidly upon a shaft 100, having a bevel-gear 101 rigidly carried upon its opposite end and intermeshing with a bevel-gear 102, mounted rigidly upon an oscillating vertical shaft 103. This latter shaft has mounted rigidly thereon the cam which actuates the feed-chains, the valve, the flies, and the lever, which times the shifting of the clutch which makes and breaks the operative connections of the booking mechanism with the initial driving-gear of the machine. This shaft is operatively connected to a pulley 104 (which is the initial driving member) by the following means: The pulley is mounted loosely upon one end of a driving-shaft 105, to which it is operatively connected by a manually-operated clutch 106, controlled by a rod 107. The opposite end of this shaft has a bevel-gear 108 rigidly mounted thereon, which intermeshes with a second bevel-gear 109, mounted in turn rigidly upon the lower end of a vertical shaft 110, having a bevel-gear 111 rigidly secured upon its upper end. This gear 111 is constantly in mesh with the gears 91 and 92, thus providing an operative connection between the initial driving-gear and the screw-shaft.

The cam above mentioned which actuates the feed-chains, &c., is indicated at 112 and has the edge of its upper surface formed with gear-teeth 113, upon which a bevel-gear 114 runs. This bevel-gear is loose upon the shaft 36 and is formed with ratchet-teeth 115, engaged by a pair of spring-bolts 116, carried by a gear 117, tight upon such shaft 36 and intermeshing with a spur-gear 118, mounted rigidly upon the shaft 35, which with shaft 36 are, as before mentioned, the driving-shafts of the conveying-chains 33, thereby completing the operative connection between the initial driving-gear and the said conveying-chains.

The flies upon which the leaves rest while being cut and which deliver the separated halves to the booking devices consist of flat boxes 120, having one side perforated, as at 121. They are rigidly secured at their larger ends upon a pair of oscillatory pipes 122 122, the ends whereof terminate in trunnions 123 123$^a$, which are mounted one at each side of the machine in two pairs of bearings 124 124 and 125 125. The portions of these pipes connected to the flies are cut away, as at 126, to effect communication therebetween and the interior of such flies, and the bearings 125 act as cams and are slidable in bases 127, formed with guiding-flanges 128, between which such cam-bearings are located. These latter are each formed with a spiral cam-groove 129, into which a pin 130 upon the trunnion 123 therein projects, and they are reciprocated intermittently by a cam-groove 131 in the upper surface of the cam 112 through the medium of a pin 132, carried rigidly by the under side of each bearing, one of such pins engaging in the cam-groove and the other having fitted therein a link 133, which is pivotally connected to one end of a compound lever 134, pivotally connected in turn to a link 135, fitted over the pin which engages the cam-groove 131. By means of this connection such cam causes the flies to simultaneously intermittently oscillate, and its action is timed to take place during the latter portion of the forward travel of the cross-head and the early portion of the rearward travel thereof. Suction is exerted upon the interior of the flies as follows: A pair of suction-boxes 140 inclose a portion of each of the pipes 122 122, such portions having openings 141 therein, and a pair of pipes 144 leads from a suction device 145. This suction device may be of any preferred type—a fan, for instance.

The pipe 144 is controlled by a slide-valve 146, pivotally connected by a stem 147 to one end of a lever 148, the opposite end whereof is forked, as at 149, and one of the prongs thereof always lies in the path of a pair of spring-pawls 150 and 151, carried adjustably upon the cam 112, thereby enabling the latter to open and close the suction-tube at the correct time. These pawls are pivotally mounted upon blocks 152, having square bolts 153 with rounded ends projecting therethrough, the heads thereof being slidably mounted in a circular T-slot 154 in the under side of the cam, while the rounded ends have nuts 155 thereon, whereby the blocks and with them the pawls can be adjusted along the slot. The springs 156 of these pawls are adapted to allow them to yield toward one another, and pins or stops 157 upon the blocks limit their movement away from one another. These pawls are so placed relatively to one another and to the forked end of the lever as to cause pawl 150 to act upon the lever and move same when cam 112 moves in the direction indicated in Figs. 2 and 10, thus closing the valve, while upon the movement of the cam in the opposite direction pawl 151 will act upon the lever and move it to open the valve. The opening action is timed to take place immediately the leaf to be stripped has reached its proper position over the flies and the flies have delivered the stripped leaf-halves to the booking mechanism.

I will now set forth means for retaining the leaf-halves against being lifted up or otherwise disturbed by the suction of the flies as they return to their positions adjacent to the blades. This means consists of a pair of retaining devices, each consisting of a pair of members or strips 160, which are automatically caused to press upon the edges of the leaf and hold the same down while the flies are returning, as just mentioned. The members of each pair have a pair of trunnions 161 projecting longitudinally from one side edge and mounted in a series of brackets 162. The trunnion at the outer end of each strip has a pulley 163, as shown particularly in Fig. 19, mounted loosely thereon, and a disk 164 tightly thereon adjacent to the pulley. The pulley and disk have pins 165 and 166, respectively, each projecting axially in the same circumferential line in order to enable one to engage the other, as will be presently shown. A coiled spring 167 encircles the trunnion and has one end secured thereto and its opposite end secured to the pulley, and the latter is connected by a belt 168 to a pulley 169, Fig. 4, upon the adjacent trunnion of the fly. A pair of weighted latches 170, Fig. 19, have one end notched, as at 171, to engage the upper edge of each member of the retaining device when in its raised position and prevent the same being lowered, such latches being each provided with a laterally-projecting lug 172 in the path of the fly. When the flies are rotated from their position adjacent to the blades to their positions adjacent to the leaf-folding mechanism, the pulleys 163 are rotated (in the direction indicated) through the medium of pulleys 169 and belts 168 and the spring 167 is tightened; but the latches 170 prevent the trunnions 161 turning, and when the flies bear upon the lugs 172 the notched ends of the latches are raised and the retainers immediately come down (under the influence of the spring) upon the projecting edges of the leaf-halves. The pins 165 and 166 are so placed relatively to one another and the difference in size of the pulleys 163 and 169 is such that the pins 165 will not engage the pins 166 and raise the retainers until the flies have moved sufficiently far from the leaf-halves to not exert any suction upon them. Thus the leaf is prevented from being lifted up or otherwise disturbed by such suction.

The booking devices are located one at each side of the machine and in positions below the flies when they are just completing their action of delivering the leaf-halves from the blades. These booking devices are the same in every respect, and I will therefore describe one only. Each device has a divided or slotted table 175, constituting the top thereof, and arranged to receive the leaf-half across the slot 176 therein. A spindle 177 is caused to act upon the leaf-halves after a predetermined number thereof have been piled thereon and press or drag them through the slot and to the boxes in which they are subsequently packed. This spindle is carried by a chain 178, driven in the direction indicated in Fig. 1 by sprocket-wheels 179, one of which is rigidly mounted upon a shaft 180, upon which a spur-gear 181 is also rigidly mounted. Such sprocket-wheels are driven in a direction to cause the chain to carry the spindle 177 downwardly through the slot in the table 175, and thence toward and over the top of the box on the corresponding side of the machine. This spur-gear intermeshes with a second one, 182, which in turn meshes with a larger one, 183, mounted rigidly upon a shaft 184. A second large gear 185 (of the same diameter as gear 183) is mounted loosely upon the shaft 184 and has a clutch-tooth 186 upon one side thereof and adjacent to the shaft. A clutch-block 189, having a clutch-tooth 188 on one end adapted to engage the tooth 186, is keyed to the shaft, and a circumferential groove 189 therein has a tooth 190 upon one side thereof, such tooth having one side beveled, as at 191. An expansile helical spring 192 bears between a collar 193, mounted rigidly upon the shaft and the block and tends to force the latter into position, with the tooth 188 thereon engaging the tooth 186 upon the gear 185. The clutch-block is maintained out of engagement with the gear 185 by a lever 195, fulcrumed, as at 196, to a portion of the frame of the machine. This is effected by means of a pin projection 197, normally in the path of the tooth 190, which rides thereon (when shaft 184 is rotating) in the direction indicated in Fig. 20 and causes the displacement of the clutch-block away from the gear 185. The end of lever 195, carrying the projection 197, is raised sufficiently to disengage the clutch by means of a second lever 198, (fulcrumed, as at 199, to a portion of the frame of the machine,) having one end 200 forked to straddle the adjacent end of lever 195, the opposite end whereof has a downwardly-projecting beveled pin 201, adapted to be engaged by beveled tooth 202 upon the upper side of a ratchet-toothed disk 203. This disk is loosely mounted upon a vertical shaft 204, carried rigidly by the frame, and a spring-pawl 205, carried by an oscillatory lever 206, is normally in operative engagement with the ratchet-teeth, while a locking-pawl 207 prevents the latter moving more than the extent of one tooth at a time. The oscillatory lever has a pair of gear-teeth 208 upon the end opposite to the actuating-pawl, such teeth being engaged by a tooth 209 upon a disk 210, mounted rigidly upon the before-mentioned oscillating vertical shaft 103, thereby completing the operative connection between the spindle-carrying chains and the initial driving-gear.

Each leaf-conveying spindle 177 is caused to assume a position over the leaf-halves, retained yieldingly in such position while folding the pile of leaf-halves, and after such pile has been conveyed to its particular box is withdrawn therefrom just before the presser-plate forces the leaf-halves into the boxes, all by the following: Each spindle is mounted slidably in a sleeve-bearing 225, formed upon one side of one of the links 226 thereof. This spindle is normally held with a tendency to project through the bearing in the direction of the machine by a retractile helical spring 227, connected at one end to a head 228 upon the outer end of the spindle and at its opposite end to the bearing 225. A plate 230 is supported upon the shafts 180 and 182$^a$ and the stub-shaft (upon which the sprocket-wheel 179 is mounted) and between the table 250 of the machine and the hubs of the three sprocket-wheels 179. This plate is of a contour to present an elongated bearing-surface which extends from a point adjacent to but slightly in advance of a point in line with the forward end of the box (to be presently described and into which the leaves are packed) to a point slightly above and in line with the slot 176 in the divided table adjacent thereto.

A pair of levers 231, fulcrumed upon a bracket 232, carried rigidly upon the frame of the machine, are forked and slidably and pivotally connected to the inner ends of a pair of slide-rods 233 through pins 1235 and blocks 234, the latter carried by the slidable rods, and the outer ends of such rods have dogs 235$^a$ rigidly thereon. A pair of retractile helical springs 236 tend to maintain the upper ends of these levers apart and the rods in their outer positions, and such levers have their upper ends forced together by a cam 237, carried rigidly upon a reciprocatory shaft 238. These levers are held temporarily with their upper ends in their positions adjacent to one another by a pair of oscillatory bars 239, projecting downwardly from and carried by an oscillatory sleeve 240, mounted upon a shaft 241, carried rigidly in bearings 242 upon the frame of the machine. A pair of lugs 243, projecting from this sleeve, has the upper end of a vertically-reciprocatory rod 244 pivotally connected thereto, while the lower end of the latter carries a spring-dog 244$^a$, resting upon a rib 244$^b$ upon the top of the reciprocatory shaft 238, which has a rise 245 thereon adapted to raise such rod or allow the same to lower, thereby oscillating the sleeve 240 and retaining or releasing the upper ends of the levers, in the latter case allowing the spring 236 to separate such levers and force the slide-rods and the spindles 177 (at that time engaged thereby) outwardly.

In order to prevent the heads 228 of the spindles 177 slipping off the dogs 235$^a$ as such spindles are being withdrawn from the leaf-halves, I secure a guiding-bracket 247 to the side of the machine and construct the same to extend over and in close proximity to the path of the heads 228 in their movement with the dogs.

As it may possibly be required under certain circumstances to steady the portions of the chains which carry the spindles 177 at the time the latter are conveying the folded piles of leaf-halves around the lower sprocket 179, a quadrantal guide 248, of channel cross-section, is secured concentrically to such sprocket by means of a hub 249 and a lug 251, both carried by the guide and the former fitting upon the shaft, upon which the said lower sprocket is mounted, while it is secured to the top of the table 250 by a screw 250$^a$, passing through such lug. A pair of plates 260 prevent the folded piles being conveyed to the boxes from ruffling the ends of the leaves of the piles previously pressed (as will be presently shown) into the boxes, and they are actuated by a lever 261, fulcrumed, as at 262, and the upper end thereof is rounded and forked, as at 263, and straddles a narrowed and flattened portion 264 of a rod 265, guided in the frame of the machine, the perimeter of this rounded end bearing between the shoulders formed by such narrowed and flattened portion. The action of these plates is timed to be simultaneous with that of the presser-plates, (to be presently described.)

In order to augment the action of the spindles in their action when forcing the leaf-halves through the divided tables 175, I mount two pairs of rollers 270 rigidly upon the opposite ends of shafts 180 and 271. Each pair of these rollers constitutes a portion of one of the booking devices, and they are timed to rotate synchronously with the downward movement of the spindles 177 for the purpose above mentioned.

The boxes 280, over which the folded leaves are placed and into which they are packed, are constructed with a pair of racks 280ª upon opposite sides of their interior. A pair of pinions 281, mounted rigidly upon a shaft 282, intermesh with the racks and cause both ends of the shaft to move in unison. A false bottom 284 in each box has on its under side a pair of slip-clutches in the form of split collars 285, tightened by clamping-screws 286, encircling the shafts 282. The spindles deliver the folded piles upon these false bottoms and the pair of presser-plates pack them into the boxes. The presser-plates (indicated at 290) are rigidly secured to the opposite ends of a pair of horizontal bars 291, the adjacent ends whereof are rigidly secured in a yoke 292 of T form, to which the upper end of a vertical reciprocatory bar 293 is rigidly secured. The lower end of this bar has a cam 294 secured thereto and adapted to straddle the reciprocatory shaft 238, which is flattened for the purpose, and has a stud 295 projecting from each side into cam-grooves 296 in the cam 294. This shaft is reciprocated by a lever 297, fulcrumed, as at 297ª, to a bracket 297ᵇ, forming a part of the machine-frame, such lever being operated by a cam 298, cut in one side of gear-wheel 183. Upon the reciprocation thereof the cam 294 transmits a vertical reciprocal movement to the presser-plates through the medium of the intermediary mechanism and packs the folded piles of leaf-halves upon the plates 284 in the boxes. The upward portion of this reciprocatory action takes place while the leaves are being conveyed to the boxes, and the downward movement takes place after the folded piles have been delivered to the boxes and the conveying-spindles have been withdrawn.

The separated stems are delivered from the blades and discharged upon the floor by the following delivery mechanism: A pair of flanged rollers 300, in close proximity to the rear sprocket-wheels 117 and 118, are mounted upon a pair of shafts 301, mounted in turn in bearings 302 in a bracket in a portion 303 of the frame of the machine. A spur-gear 304 is mounted rigidly upon one end of the shaft 35, upon which sprocket-wheel 118 is mounted, a pair of spur-gears 303 306 being mounted rigidly upon the shafts 301, and an idler 307 is located between and intermeshes with the spur-gears 304 and 305. A pair of endless belts 308 309 are looped over the flanged pulleys 300 and over a pair of pulleys 310, mounted loosely upon a pair of shafts 311, carried in bearings 312 upon a chute 313. As each leaf is conveyed to position to be stemmed the stem of the leaf previously acted upon is conveyed between the blades toward the rear of the machine by the feed-chains 33, and it is projected to a position to be gripped between the belts 308 309 of the delivery mechanism which convey it to the chute down which it slides to the floor, thus delivering it from the machine.

The shipper (before mentioned) which automatically shifts the clutch-block 93 from engagement with one of the bevel-gears 91 and 92 into engagement with the other, thereby causing the screw-shaft 82 to rotate alternately in opposite directions, consists of a reciprocatory shipper-rod 325, supported slidably in bearings 326, formed upon the tops of bearing 90. An upwardly-projecting portion 327 upon the cross-head is bored to slip over this shipper-rod, and a pair of blocks 328 are secured upon the latter by set-screws 329, while these blocks are counterbored to afford sockets 330, in which compression-springs 331 are located. A pair of trip-levers 332 333 are pivotally carried, the one by the top of the forward bearing 326 and the other by a block 334, bored to slip over the shipper-rod and slidably secured to a localizing-rod 335, to which such block is adjustably connected by a set-screw 336. The trip-levers are formed with shoulders 337, and they are held by spring 337ª yieldingly in position to be borne upon by a pair of teats 338 upon the tops of the socketed blocks 328. By adjusting the block 328, and with it block 334 and lever 333, toward or from the forward end of the machine the extent of travel of the head is varied to suit different lengths of leaves.

Operation: The leaf is first placed on the spreading-table and its butt is inserted between the feeding-rollers which act upon the stem and project the leaf to the conveying-chains, between which (as in my former machine) the leaf is conveyed to its proper position upon the cutting edges of the blades, the stem being held between the chains and the sides of the leaf resting upon the flies. The valve controlling the suction then opens, thus causing the leaf-halves to be held against displacement on the flies. The stretching-rods then bear down upon the portions of the leaf at each side of the blades, thereby taking up any slack and causing the portions of the leaf in the immediate vicinity of the stem to be drawn tightly over the cutting edges and insuring a clean cut. The presser-rollers then pass over the leaf, thus severing or stripping the stem therefrom. The stretching-rods are raised just before the flies, with the leaf-halves held thereon, commence to move to place the latter upon the slotted tables of the booking devices, the center of the leaf, owing to the adjustment of the screw, being always placed over the slot. The leaf-conveying spindles which are timed to act only after a predetermined number of leaves have been placed or piled on the slotted tables then begin to move and escape their guiding-plates and shoot into position over the piles of leaves. Simultaneously it commences its movement downwardly, bears upon the leaf-halves, and forces them, with the assistance of the rollers, through the slots in the tables of the booking devices and drags them to postions over the packing-boxes. During the movement of the folded leaves, with the spindles, along the lower level of their travel they are supported by the supporting-plates, which prevent the ends of the leaf-halves dragging over the ends of the piles previously placed in the box. Immediately before the piles arrive in their positions over the tops of the boxes the presser-plates rise from the piles previously packed thereby into the boxes to admit the new piles. The spindle is then pulled out quickly from the folded piles of leaf-halves, leaving such leaf-halves in the box. At the same time the sliding supporting-plates recede, giving room to the presser-plates, which come down and pack the piles into the boxes. The spindles are withdrawn, then assume their positions resting on the guiding-plates, and are finally returned to their normal positions, ready for the next operation. There is a certain amount of lost motion in the oscillatory cam and also between the times of action of the intermittent gear. This lost motion affords the time in which the variation, to accommodate different sizes of leaves, can be effected. When the cross-head arrives at the end of its travel in either direction, it first compresses the spring 331 between it and the block 328, toward which it is moving, and then raises the trip-lever 332, retaining such block, and allows the spring to shoot the block, and with it the shipper-rod, and move the clutch from engagement with one of the gears 91 92 into engagement with the other, thereby reversing the direction of rotation of the screw-shaft.

What I claim is as follows:

1. The combination with a cutting device, and means for placing the article to be cut in position to be acted upon, of feed mechanism for feeding the article to the means for placing the same, such feed mechanism consisting of a pair of feed-rollers and yielding means retaining such rollers against displacement away from one another and a roller retaining the article against displacement from the path in which it is caused to travel by the said rollers.

2. The combination with a cutting device, and means for placing the article to be cut in position to be acted upon, of feed mechanism for feeding the article to the means for placing the same, such feed mechanism consisting of a pair of feed-rollers with their axes parallel to one another and means located above the rollers and affording a bearing in a line parallel to the axial plane of the pair of feed-rollers, for retaining the article against displacement from the said rollers in such line parallel to the said axial plane.

3. The combination with a cutting device, and means for placing the article to be cut in position to be acted upon, of feed mechanism for feeding the article to the means for placing the same, such feed mechanism consisting of a pair of vertically-arranged feed-rollers and means in vertical line with the point at which such rollers bear upon one another for retaining the article against upward displacement from the said rollers.

4. The combination with a cutting device, and means for placing the article to be cut in position to be acted upon, of feed mechanism for feeding the article to the means for placing the same, such feed mechanism consisting of a pair of feed-rollers, constructed of rigid material, means yieldingly retaining such rollers against displacement away from one another, and a roller retaining the article against upward displacement from the said rollers.

5. The combination with tobacco-leaf-stripping mechanism comprising a cutting device, and means for placing a tobacco-leaf in position to be cut, of feed mechanism for feeding the leaf to the means for placing the same, such feed mechanism consisting of a pair of feed-rollers with their axes parallel to one another and means yieldingly retaining such rollers against displacement away from one another.

6. The combination with a cutting device, and means for placing the article to be cut in position to be acted upon, of feed mechanism for feeding the article to the means for placing the same, such feed mechanism consisting of a pair of axially-yielding feed-rollers with their axes parallel to one another, and means retaining the article against upward displacement from said rollers.

7. The combination with a cutting device, and means for placing the article to be cut in position to be acted upon, of feed mechanism for feeding the article to the means for placing the same, such feed mechanism consisting of a pair of axially-yielding feed-rollers with their axes parallel to one another, means yieldingly retaining such rollers against displacement away from one another and means retaining the article against upward displacement from the said rollers.

8. The combination with a cutting device, and means for placing the article to be cut in position to be acted upon, of feed mechanism for feeding the article to the means for placing the same, such feed mechanism consisting of a pair of feed-rollers and a roller retaining the article against upward displacement from the said rollers.

9. The combination with a cutting device, and means for placing the article to be cut in position to be acted upon, of feed mechanism for feeding the article to the means for placing the same, such feed mechanism consisting of a pair of feed-rollers with their axes parallel to one another and a roller retaining the article against upward displacement from the said rollers.

10. The combination with a cutting device, and means for placing the article to be cut in position to be acted upon, of feed mechanism for feeding the article to the means for placing the same, such feed mechanism consisting of a pair of feed-rollers with their axes parallel to one another, means yieldingly retaining such rollers against displacement away from one another and a roller retaining the article against upward displacement from the said rollers.

11. The combination with a cutting device presenting an elongated cutting edge, and means for placing the article to be cut in position to be acted upon, of feed mechanism for feeding the article to the means for placing the same, such feed mechanism consisting of a pair of axially-yielding feed-rollers with their axes parallel to one another, means yieldingly retaining such rollers against displacement away from one another and a roller retaining the article against upward displacement from the said rollers.

12. In a tobacco-leaf-stripping machine the combination with a cutting device and a presser device adapted to bear intermittently upon such cutting device, stretching members, and means whereby the said members are caused to bear upon the leaf and stretch the same over the cutting device before the cutting operation and remain stationary stretching the leaf during the cutting operation, substantially as described.

13. In a tobacco-leaf-stripping machine the combination with a cutting device and a presser device adapted to bear intermittently upon such cutting device, of means for stretching the leaf over the said cutting device consisting of a pair of members extending parallel to the cutting device one at each side thereof and means whereby such members are reciprocated to and from the said position.

14. In a tobacco-leaf-stripping machine the combination with a cutting device and a presser device adapted to bear intermittently upon such cutting device, of means for stretching the leaf over the said cutting device consisting of a pair of members extending parallel to the cutting device one at each side thereof and means whereby such members are reciprocated to and from the said position.

15. In a tobacco-leaf-stripping machine the combination with a cutting device and a presser device adapted to bear intermittently upon such cutting device, of means for stretching the leaf over the said cutting device consisting of a pair of members extending parallel to the cutting device one at each side thereof and means acting simultaneously with the presser device whereby such members are reciprocated to and from the said position.

16. In a tobacco-leaf-stripping machine the combination with a cutting device and a presser device adapted to bear intermittently upon such cutting device, of means for stretching the leaf over the said cutting device consisting of a pair of round bars extending parallel to the cutting device one at each side thereof and means whereby such round bars are reciprocated to and from the said position.

17. In a tobacco-leaf-stripping machine the combination with a cutting device and a presser device adapted to bear intermittently upon such cutting device, of means for stretching the leaf over the said cutting device consisting of a pair of round bars extending parallel to the cutting device one at each side thereof and means acting simultaneously with the presser device whereby such round bars are reciprocated to and from the said position.

18. In a tobacco-leaf-stripping machine the combination with a cutting device and a presser device adapted to bear intermittently upon such cutting device, of means for stretching the leaf over the said cutting device consisting of a pair of round bars having a cam mounted thereon extending parallel to the cutting device one at each side thereof and operatively connecting the presser device to such cam whereby such round bars are reciprocated to and from the said position.

19. In a tobacco-leaf-stripping machine, the combination with a stemming device, of a pair of hollow suction members located one at each side of the stemming device and adapted to receive the stemmed leaf from the stemming device, means for moving such suction members to different positions relatively to the stemming device, and means for exerting a suction upon the interior of such members.

20. In a tobacco-leaf-stripping machine, the combination with a stemming device, of a pair of perforated boxes located one at each side of the stemming device and adapted to receive the stemmed leaf from the stemming device, means for moving such boxes to different positions relatively to the stemming device, and means for exerting a suction upon the interior of such boxes.

21. In a tobacco-leaf-stripping machine, the combination with a stemming device of a pair of hollow oscillatory flies having one side perforated, one of such flies being located at each side of the stemming device and such flies being adapted to receive the stemmed leaf from the stemming device, means for oscillating such flies and causing the same to deliver the stemmed leaf away from the stemming device, and means for exerting a suction upon the interior of the flies during the oscillatory movement thereof in one direction only.

22. Tobacco-leaf-booking mechanism comprising a support for the leaves to be booked, means for folding such leaves upon themselves and means for conveying the folded leaves from the folding means to a delivery-point.

23. Tobacco-leaf-booking mechanism comprising a support for the leaves to be booked, means for placing leaves upon such support, means for folding such leaves upon themselves and means for conveying the folded leaves from the folding means to a delivery-point.

24. Tobacco-leaf-booking mechanism comprising a support for the leaves to be booked, means for placing leaves upon such support, means for folding predetermined quantities of such leaves upon themselves and means for conveying the folded leaves from the folding means to a delivery-point.

25. In tobacco-leaf-booking mechanism the combination with a support for the leaves to be booked, and a receptacle for the booked leaves such receptacle being located a distance from the support, of means for folding such leaves upon themselves and means for conveying such folded leaves from the support to the receptacle.

26. In tobacco-leaf-booking mechanism the combination with a slotted table for supporting the leaves to be booked and a receptacle for the booked leaves such receptacle being located a distance from the slotted table, of a conveying device, means for causing the same to pass laterally through the slot to the receptacle and convey the leaves therewith, and means for disengaging such conveying device from the leaves after the said leaves have reached the receptacle.

27. In tobacco-leaf-booking mechanism the combination with a slotted table for supporting the leaves to be booked and a receptacle for the booked leaves such receptacle being located a distance from the slotted table, of a conveying-spindle, means for causing the same to pass laterally through the slot to the receptacle and convey the leaves therewith, and means for disengaging such conveying-spindle, from the leaves after the said leaves have reached the receptacle.

28. In tobacco-leaf-booking mechanism the combination with a slotted table means for placing leaves thereon over the slot and a receptacle such receptacle being located a distance from the slotted table, of a conveying-spindle, means whereby such spindle is caused to assume a position extending over the leaves upon the table when a predetermined number have been placed, means whereby the spindle is caused to pass laterally through the slot to the receptacle, and means for withdrawing the spindle from the leaves when they reach the receptacle and means for packing such leaves into the receptacle.

29. In tobacco-leaf-booking mechanism the combination with a slotted table, means for placing leaves thereon over the slot, and a receptacle such receptacle being located a distance from the slotted table, of a conveying-spindle, means whereby such spindle is caused to assume a position extending over the leaves upon the table when a predetermined number have been placed, means whereby the spindle is caused to pass laterally through the slot to the receptacle, means for withdrawing the spindle from the leaves when they reach the receptacle and means for packing such leaves into the receptacle.

30. In tobacco-leaf-booking mechanism the combination with a slotted table, and means for placing leaves thereon over the slot, of a carrier adapted to travel in a path extending downwardly through the slot to the side of the receptacle opposite to the said slot, means whereby the carrier is caused to intermittently traverse such path, a spindle carried by the carrier and retained yieldingly in position transversely to the table, means whereby the spindle is withdrawn from such position when it has passed across the receptacle, and means whereby the said spindle is allowed to again assume the said position after it has arrived at a point above the table.

31. In tobacco-leaf-booking mechanism the combination with a slotted table, and means for placing leaves thereon over the slot, of a chain adapted to travel in a path extending downwardly through the slot and to the side of the receptacle opposite to the said slot, means whereby the chain is caused to intermittently traverse such path, a spindle carried by the carrier and retained yieldingly in position transversely to the table, means whereby the spindle is withdrawn from such position when it has passed across the receptacle, and means whereby the said spindle is allowed to again assume the said position after it has arrived at a point above the table.

32. In tobacco-leaf-booking mechanism the combination with a slotted table, and means for placing leaves thereon over the slot, of a carrier adapted to travel in a path extending downwardly through the slot and to the side of the receptacle opposite to the said slot, means whereby the carrier is caused to intermittently traverse such path, a spindle carried by the carrier and retained yieldingly in position transversely to the table, means whereby the spindle is withdrawn from such position when it has passed across the receptacle, and means whereby the said spindle is allowed to again assume the said position after it has arrived at a point above the table, a traveler-support for the leaves and means for causing such traveling support to move the spindle.

33. In tobacco-leaf-booking mechanism the combination with a slotted table, and means for placing leaves thereon over the slot, of a chain adapted to travel in a path extending downwardly through the slot and to the side of the receptacle opposite to the said slot, means whereby the chain is caused to intermittently traverse such path, a spindle carried by the carrier and retained yieldingly in position transversely to the table, means whereby the spindle is withdrawn from such position when it has passed across the receptacle, and means whereby the said spindle is allowed to again assume the said position after it has arrived at a point above the table, a traveling support for the leaves and means for causing such traveling support to move with the spindle.

34. In tobacco-leaf-booking mechanism the combination with a slotted table, and means for placing leaves thereon over the slot, of a chain adapted to travel in a path extending downwardly through the slot and to the side of the receptacle opposite to the said slot, means whereby the chain is caused to intermittently traverse such path, a spindle carried by the carrier and retained yieldingly in position transversely to the table, means whereby the spindle is withdrawn from such position when it has passed across the receptacle, and means whereby the said spindle is allowed to again assume the said position after it has arrived at a point above the table, a traveling plate for supporting the leaves and means for causing such plate to move with the spindle.

35. In tobacco-leaf-booking mechanism the combination with a receptacle, and a support for the leaves to be booked, such support having an opening therein, of means for placing tobacco-leaves upon the support over the opening therein; a carrier adapted to travel across the plane of such support, then across the mouth of the receptacle, and finally back to its starting-point, a spindle carried by the carrier and adapted to be moved to and from a position projecting across the support, means yieldingly retaining the spindle in such projected position; means moving the spindle from such position after it has passed the mouth of the receptacle, means retaining the spindle against movement to its position across the support and for releasing the same when a predetermined number of leaves have been placed upon the support; and means for intermittently moving the carrier around its path.

36. In tobacco-leaf-booking mechanism the combination with a receptacle, and a support for the leaves to be booked, such support having an elongated opening therein, of means for placing tobacco-leaves upon the support over the opening therein; a carrier adapted to travel across the plane of such support, then across the mouth of the receptacle, and finally back to its starting-point; a spindle carried by the carrier and adapted to be moved to and from a position projecting across the support in line with the opening therein, means yieldingly retaining the spindle in such projected position; means moving the spindle from such position after it has passed the mouth of the receptacle, such means consisting of a lever located adjacent to the mouth of the receptacle, such lever being adapted to oscillate at right angles to the path of the carrier and engage and move the spindle for the purpose of disengaging the latter from the leaves, means temporarily retaining the spindle against movement to its position across the support and for releasing the same when a predetermined number of leaves have been placed upon the support; and means for intermittently moving the carrier around its path.

37. In tobacco-leaf-booking mechanism the combination with a receptacle, and a support for the leaves to be booked, such support having an opening therein, of means for placing tobacco-leaves upon the support over the opening therein; a series of rollers; an endless flexible length looped around and in rotative connection with the rollers such rollers being disposed to cause the flexible length to travel across the plane of such support, then across the mouth of the receptacle, and finally back to its starting-point, a spindle carried by the flexible length and adapted to be moved to and from a position projecting across the support; means yieldingly retaining the spindle in such projected position; means moving the spindle from such position after it has passed the mouth of the receptacle; means retaining the spindle against movement to its position across the support and for releasing the same when a predetermined number of leaves have been placed upon the support; and means for intermittently moving the flexible length around its path.

38. In tobacco-leaf-booking mechanism the combination with a receptacle, and a support for the leaves to be booked, such support having an opening therein, of means for placing tobacco-leaves upon the support over the opening therein; a series of sprocket-wheels, an endless chain looped around and in rotative connection with the sprocket-wheels such sprocket-wheels being disposed to cause the chain to travel across the plane of such support, then across the mouth of the receptacle, and finally back to its starting-point; a spindle carried by the chain and adapted to be moved to and from a position projecting across the support; means yieldingly retaining the spindle in such projected position; means moving the spindle from such position after it has passed the mouth of the receptacle; means retaining the spindle against movement to its position across the support and for releasing the same when a predetermined number of leaves have been placed upon the support; and means for intermittently rotating such sprocket-wheels.

39. In tobacco-leaf-booking mechanism the combination with a receptacle, and a support for the leaves to be booked, such support having an elongated opening therein, of means for placing tobacco-leaves upon the support over the opening therein; a series of sprocket-wheels, an endless chain looped around and in rotative connection with the sprocket-wheels such sprocket-wheels being so disposed as to cause the chain to be located adjacent to one side of the support and at right angles to the opening therein and to travel across the plane of such support, then across the mouth of the receptacle, and finally back to its starting-point; a spindle carried by the chain and adapted to be moved to and from a position projecting across the support in line with the opening therein; means yieldingly retaining the spindle in such projected position; a lever located adjacent to the mouth of the receptacle, such lever being adapted to oscillate at right angles to the path of the carrier and engage and move the spindle for the purpose of disengaging the latter from the leaves, means retaining the spindle against movement to its position across the support and for releasing the same when a predetermined number of leaves have been placed upon the support; and means for intermittently rotating such sprocket-wheels.

40. In a machine for the treatment of tobacco-leaves the combination with a tobacco-leaf-stemming device, a receptacle, and a support for the stemmed leaves, such support having an opening therein, of means for conveying the leaves from the stemming devices to the support, a series of rollers, an endless flexible length looped around and in rotative connection with the rollers such rollers being disposed to cause the flexible length to travel across the plane of such support, then across the mouth of the receptacle, and finally back to its starting-point; a spindle carried by the flexible length and adapted to be moved to and from a position projecting across the support; means yieldingly retaining the spindle in such projected position; means moving the spindle from such position after it has passed the mouth of the receptacle; means retaining the spindle against movement to its position across the support and for releasing the same when a predetermined number of leaves have been placed upon the support; and means for intermittently moving the flexible length around its path.

41. In a machine for the treatment of tobacco-leaves the combination with a tobacco-leaf-stemming device, a receptacle, and a support for the stemmed leaves, such support having an opening therein, of means for conveying the leaves from the stemming device to the support, a carrier adapted to travel across the plane of such support, then across the mouth of the receptacle, and finally back to its starting-point; a spindle carried by the carrier and adapted to be moved to and from a position projecting across the support; means yieldingly retaining the spindle in such projected position; means moving the spindle from such position after it has passed the mouth of the receptacle; means retaining the spindle against movement to its position across the support and for releasing the same when a predetermined number of leaves have been placed upon the support; and means for intermittently moving the carrier around its path.

42. In a machine for the treatment of tobacco-leaves the combination with a tobacco-leaf-stemming device, a receptacle, and a support for the stemmed leaves, such support having an elongated opening therein, of means for conveying the leaves from the stemming device to the support, a carrier adapted to travel across the plane of such support, then across the mouth of the receptacle, and finally back to its starting-point; a spindle carried by the carrier and adapted to be moved to and from a position projecting across the support in line with the opening therein; means yieldingly retaining the spindle in such projected position; a lever located adjacent to the mouth of the receptacle such lever being adapted to oscillate at right angles to the path of the flexible length; means retaining the spindle against movement to its position across the support and for releasing the same when a predetermined number of leaves have been placed upon the support; and means for intermittently moving the carrier around its path.

43. In a machine for the treatment of tobacco-leaves the combination with a tobacco-leaf-stemming device, a receptacle, and a support for the stemmed leaves, such support having an elongated opening therein, of means for conveying the leaves from the stemming device to the support, a series of sprocket-wheels; an endless chain looped around and in rotative connection with the sprocket-wheels, such sprocket-wheels being disposed to cause the chain to be located adjacent to one side of the support and at right angles to the opening therein and to travel across the plane of such support, then across the mouth of the receptacle, and finally back to its starting-point; a spindle carried by the chain and adapted to be moved to and from a position projecting across the support in line with the opening therein; means yieldingly retaining the spindle in such projected position; a lever located adjacent to the mouth of the receptacle such lever being adapted to oscillate at right angles to the path of the chain; means retaining the spindle against movement to its position across the support and for releasing the same when a predetermined number of leaves have been placed upon the support; and means for intermittently rotating such sprocket-wheels.

44. In tobacco-leaf-booking mechanism the combination with a support for the leaves to be booked and a receptacle adapted to receive the booked leaves, of a device adapted to remove the leaves from the support and convey them to the receptacle, means operating such devices, means whereby the device is caused to engage the leaves before removing them from the support and means whereby the device is disengaged from the leaves after having conveyed them to the receptacle.

45. In a machine for stripping and booking tobacco-leaves the combination with a stemming device, a support for the leaves to be booked, means for removing the stemmed leaves from the stemming device to the support, and a receptacle adapted to receive the booked leaves, of a device adapted to remove the leaves from the support and convey them to the receptacle, means operating such device, means whereby the device is caused to engage the leaves before removing them from the support, and means whereby the device is disengaged from the leaves after having conveyed them to the receptacle.

46. In tobacco-leaf-booking mechanism the combination with a support for the leaves to be booked, means placing leaves upon the support, and a receptacle adapted to receive the booked leaves, of a device adapted to remove the leaves from the support and convey them to the receptacle, means intermittently operating such device when a predetermined quantity of leaves have been placed upon the support, means whereby the device is caused to engage the leaves before removing them from the support, and means whereby the device is disengaged from the leaves after having conveyed them to the receptacle.

47. In a machine for stripping and booking tobacco-leaves the combination with a support for the leaves to be booked, means for removing the stemmed leaves from the stemming devices to the support, and a receptacle adapted to receive the booked leaves, of a device adapted to remove the leaves from the support and convey them to the receptacle, means intermittently operating such device when a predetermined quantity of leaves have been placed upon the support, means whereby the device is caused to engage the leaves before removing them from the support, and means whereby the device is disengaged from the leaves after having conveyed them to the receptacle.

48. In tobacco-leaf-booking mechanism the combination with a support for the leaves to be booked and a receptacle for the booked leaves, of a spindle adapted to remove the leaves from the support and convey them to the receptacle, means operating such spindle, means whereby the spindle is caused to engage the leaves before removing them from the support such means consisting of a spring in bearing relation with the spindle and adapted to retain the same yieldingly in position to engage the leaves upon the support and a guiding device extending from the receptacle to the support, and means whereby the spindle is disengaged from the leaves after having conveyed them to the receptacle, such last-mentioned means consisting of a slidable member adapted to be engaged by the spindle, and means for moving such member when engaged by the spindle, to a position adjacent to the guiding device.

49. In tobacco-leaf-booking mechanism the combination with a support for the leaves to be booked and a receptacle for the booked leaves, of a spindle adapted to remove the leaves from the support and convey them to the receptacle, means operating such spindle, means whereby the spindle is caused to engage the leaves before removing them from the support such means consisting of a spring in bearing relation with the spindle and adapted to retain the same yieldingly in position to engage the leaves upon the support and a guiding-plate extending parallel to the path of the spindle in its return from the receptacle to its position over the support, and means whereby the spindle is disengaged from the leaves after having conveyed them to the receptacle, such last-mentioned means consisting of a slidable member adapted to have the spindle ride thereon, and means for moving such member when the spindle rides thereon to a position to and in line with the guiding device.

50. In a machine for stripping and booking tobacco-leaves the combination with a stemming device, a support for the leaves, means for removing the stemmed leaves from the stemming device to the support and a receptacle for the booked leaves, of a spindle adapted to remove the leaves from the support and convey them to the receptacle, means operating such spindle, means whereby the spindle is caused to engage the leaves before removing them from the support, such means consisting of a spring in bearing relation with the spindle and adapted to retain the same yieldingly in position to engage the leaves upon the support and a guiding device extending from the receptacle to the support, and means whereby the spindle is disengaged from the leaves after having conveyed them to the receptacle, such last-mentioned means consisting of a slidable member adapted to be engaged by the spindle, and means for moving such member when engaged by the spindle, to a position adjacent to the guiding device.

51. In a machine for stripping and booking tobacco-leaves the combination with a stemming device, a support for the leaves, means for removing the stemmed leaves from the stemming device to the support and a receptacle for the booked leaves, of a spindle adapted to remove the leaves from the support and convey them to the receptacle, means intermittently operating such spindle when a predetermined quantity of leaves have been placed upon the support, means whereby the spindle is caused to engage the leaves before removing them from the support, such means consisting of a spring in bearing relation with the spindle and adapted to retain the same yieldingly in position to engage the leaves upon the support and a guiding-plate extending parallel to the path of the spindle in its return from the receptacle to its position over the support, and means whereby the spindle is disengaged from the leaves after having conveyed them to the receptacle, such last-mentioned means consisting of a slidable member adapted to have the spindle ride thereon, and means for moving such member when the spindle rides thereon, to a position adjacent to and in line with the guiding device.

52. In a tobacco-stripping machine the combination with a pair of straight blades arranged adjacent to one another, of a screw rotatably supported above and parallel to the blades, means for rotating the screw alternately in opposite directions, a movable block in operative connection with the screw and adapted to have movement longitudinally of the screw imparted thereto upon the rotation of the latter, and a presser-roller carried by the block and bearing upon the blades.

53. In a tobacco-stripping machine, the combination with a pair of straight blades arranged adjacent to one another, of a screw rotatably supported above and parallel to the blades, means for rotating the screw alternately in opposite directions, a movable block in operative connection with the screw and adapted to have movement longitudinally of the screw imparted thereto upon the rotation of the latter, and a yielding roller carried by the block and bearing upon the blades.

54. In a tobacco-stripping machine, the combination with a pair of straight blades arranged adjacent to one another and means whereby leaves to be stripped are placed upon such blades, of a screw rotatably supported above and parallel to the blades, means for rotating the screw alternately in opposite directions, a movable block in operative connection with the screw and adapted to have movement longitudinally of the screw imparted thereto upon the rotation of the latter, and a yielding presser-roller carried by the block and bearing upon the blades.

55. In a tobacco-leaf-stripping machine, the combination with a stemming device, and a pair of flies adapted to receive the leaf-halves from the stemming device and place them away from the latter, of means for preventing the return of the placed leaves with the flies.

56. In a tobacco-leaf-stripping machine, the combination with a stemming device, and a pair of flies adapted to receive the leaf-halves from the stemming device and place them away from the latter, of means adapted to bear upon the placed leaves for preventing the return thereof with the flies.

57. In tobacco-leaf-booking mechanism the combination with a support for the leaves to be booked, and a receptacle for the booked leaves, of means whereby the leaves are folded and dragged from the support to the receptacle; auxiliary means, coacting with the last-mentioned means for carrying the leaves as they are dragged; means for actuating the dragging and folding means and means for actuating the auxiliary means.

58. In tobacco-leaf-booking mechanism the combination with a support for the leaves to be booked, and a receptacle for the booked leaves, of means whereby the leaves are folded and dragged from the support to the receptacle; a supporting-plate for carrying the leaves as they are dragged; means for actuating the dragging and folding means and means for causing the supporting-plate to travel with the dragging means.

59. Leaf booking and packing mechanism consisting of a support for the leaves to be booked, a receptacle adapted to receive the booked leaves, a device adapted to remove the leaves from the support and convey them to the receptacle, and means for packing the leaves into the receptacle.

60. Leaf booking and packing mechanism consisting of a support for the leaves to be booked, a receptacle adapted to receive the booked leaves, a device adapted to remove the leaves from the support and convey them to the receptacle, a packing-plate, and means for causing such plate to press the leaves into the receptacle.

61. Leaf booking and packing mechanism consisting of a support for the leaves to be booked, a receptacle adapted to receive the booked leaves, a device adapted to remove predetermined quantities of the leaves from the support and convey them to the receptacle, and means for packing the leaves into the receptacle.

62. Leaf booking and packing mechanism consisting of a support for the leaves to be booked, a receptacle adapted to receive the booked leaves, a device adapted to remove predetermined quantities of the leaves from the support and convey them to the receptacle, a packing-plate, and means for causing such plate to press the leaves into the receptacle.

63. In a tobacco-leaf-stripping machine, a cutting device adapted to separate the leaf-halves from the stem; a pair of leaf-supports located one at each side of the cutting device; a pair of receptacles located one at each side of the cutting device from the folding means; means conveying the separated leaf-halves from the cutting device to the supports; a pair of devices adapted to remove the leaf-halves from the supports and convey them to the receptacles; and means for packing the leaf-halves into the receptacles.

64. In a tobacco-leaf-stripping machine, a cutting device adapted to separate the leaf-halves from the stem; a pair of leaf-supports located one at each side of the cutting device; a pair of receptacles located one at each side of the cutting device from the folding means; means conveying the separated leaf-halves from the cutting device to the supports; a pair of devices adapted to remove the leaf-halves from the supports and convey them to the receptacles; and a pair of packing-plates and means for causing such plates to press the leaf-halves into the receptacles.

65. In a tobacco-leaf-stripping machine, a cutting device adapted to separate the leaf-halves from the stem; a pair of leaf-supports located one at each side of the cutting device; a pair of receptacles located one at each side of the cutting device from the folding means; means conveying the separated leaf-halves from the cutting device to the supports; a pair of devices adapted to remove predetermined quantities of the leaf-halves from the supports and convey them to the receptacles; and means for packing the leaf-halves into the receptacles.

66. In a tobacco-leaf-stripping machine, a cutting device adapted to separate the leaf-halves from the stem; a pair of leaf-supports located one at each side of the cutting device; a pair of receptacles located one at each side of the cutting device from the folding means; means conveying the separated leaf-halves from the cutting device to the support; a pair of devices adapted to remove predetermined quantities of the leaf-halves from the supports and convey them to the receptacles; and a pair of packing-plates and means for causing such plates to press the leaf-halves into the receptacles.

67. In a tobacco-leaf-stripping machine the combination with a stemming device, and a pair of flies adapted to receive the leaf-halves from the stemming device and place them away from the latter, of members for preventing the return of the placed leaves with the flies and means for actuating such members alternately with the flies.

68. In a tobacco-leaf-stripping machine the combination with a stemming device, and a fly adapted to receive a leaf-half from the stemming device and place it away from the latter, of members for preventing the return of the placed leaf-half with the fly, and means operatively connecting the fly to the said means for preventing the return of the placed leaf-half, for the purpose set forth.

69. In a tobacco-leaf-stripping machine the combination with a stemming device, and a fly adapted to receive a leaf-half from the stemming device and place it away from the same, of a member under the control of the fly for bearing upon the edge of the placed leaf-half and retaining the same against movement with the fly as the latter returns to the stemming device, and means under the control of the fly for temporarily holding the retaining member against movement, for the purpose set forth.

70. In a tobacco-leaf-stripping machine the combination with a stemming device, and a fly adapted to receive a leaf-half from the stemming device and place it away from the same, of a leaf-retaining strip having a trunnion and extending parallel to the outer edge of the fly and adjacent to latter when in its position away from the stemming device, such trunnion having a pulley mounted loosely thereon, and a disk mounted tightly thereon adjacent to and coaxially with the pulley, a pair of pins projecting respectively in the same circumferential line from contiguous sides of the pulley and disk, a coiled spring connected at one end to the pulley and at its opposite end to the trunnion, a pulley mounted rigidly upon the fly concentrically to the axis thereof, a belt looped around the two pulleys, and means under the control of the fly for temporarily holding the strip against movement by the spring, for the purpose set forth.

71. In a tobacco-leaf-stripping machine the combination with a stemming device, and a fly adapted to receive a leaf-half from the stemming device and place it away from the same, of a leaf-retaining strip having a trunnion and extending parallel to the outer edge of the fly and adjacent to latter when in its position away from the stemming device, such trunnion having a pulley mounted loosely thereon, and a disk mounted tightly thereon adjacent to and coaxially with the pulley, a pair of pins projecting respectively in the same circumferential line from contiguous sides of the pulley and disk, a coiled spring connected at one end to the pulley and at its opposite end to the trunnion, a pulley mounted rigidly upon the fly concentrically to the axis thereof, a belt looped around the two pulleys, a weighted latch adapted to engage and hold the strip when in its position away from the leaf and having a portion intersecting the path of the fly and upon the movement whereof by the fly the strip is released, for the purpose set forth.

In testimony whereof I have signed my name to this specification in the presence of two subscribing witnesses.

GUSTAVE ANTOINE MARIER.

Witnesses:
WILLIAM P. McFEAT,
FRED. J. SEARS.